July 25, 1944. W. S. LEMMON ET AL Re. 22,523

SYSTEM OF CODING AND DECODING

Original Filed May 22, 1936 16 Sheets-Sheet 1

INVENTORS
Walter S. Lemmon
Charles R. Stutz
Richard F. Wiley
Albert C. Hoff
BY W. Marsh
ATTORNEY

SYSTEM OF CODING AND DECODING

Original Filed May 22, 1936 16 Sheets-Sheet 2

INVENTORS
Walter S. Lemmon
Charles R. Stott
Richard F. Wolfe
Albert E. West

BY W. M. Colson
ATTORNEY

| | |
|---|---|
| FIG.17. | FIG.17B. |
| FIG.17A. | |

| |
|---|
| FIG.20 |
| FIG.20A. |
| FIG.20B |
| FIG.20C |
| FIG.20D |

INVENTORS
Walter S. Lemmon
Charles R. Lloyd
Richard T. Kelly
Albert E. Hall
BY
W. W. Walker
ATTORNEY

SYSTEM OF CODING AND DECODING

Original Filed May 22, 1936 16 Sheets-Sheet 4

INVENTORS
Walter S. Lemmon
Charles A. Lang
Richard F. Ashby
Robert E. Pratt
BY
W. M. Nelson
ATTORNEY July 25, 1944. W. S. LEMMON ET AL Re. 22,523
SYSTEM OF CODING AND DECODING
Original Filed May 22, 1936 16 Sheets-Sheet 5
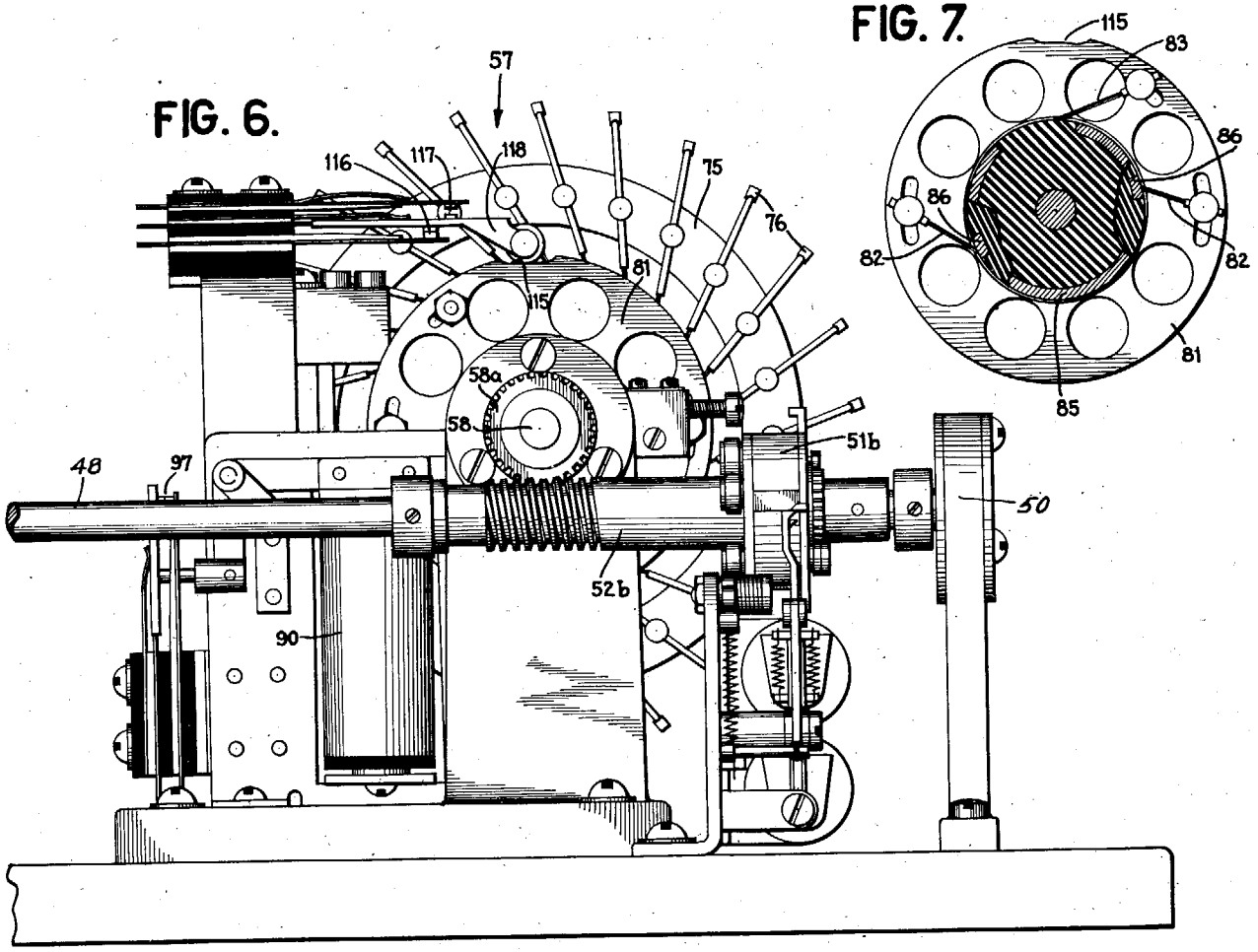
INVENTORS
Walter S. Lemmon
Charles P. Stott
Richard F. Wisby
Albert C. Hott
BY
W. M. Gibson
ATTORNEY

SYSTEM OF CODING AND DECODING

Original Filed May 22, 1936 16 Sheets-Sheet 6

INVENTORS
Walter S. Lemmon
Charles R. Wirt
Richard F. Way
Robert E. Hill
BY
W. Malcolm
ATTORNEY SYSTEM OF CODING AND DECODING
Original Filed May 22, 1936 16 Sheets-Sheet 7
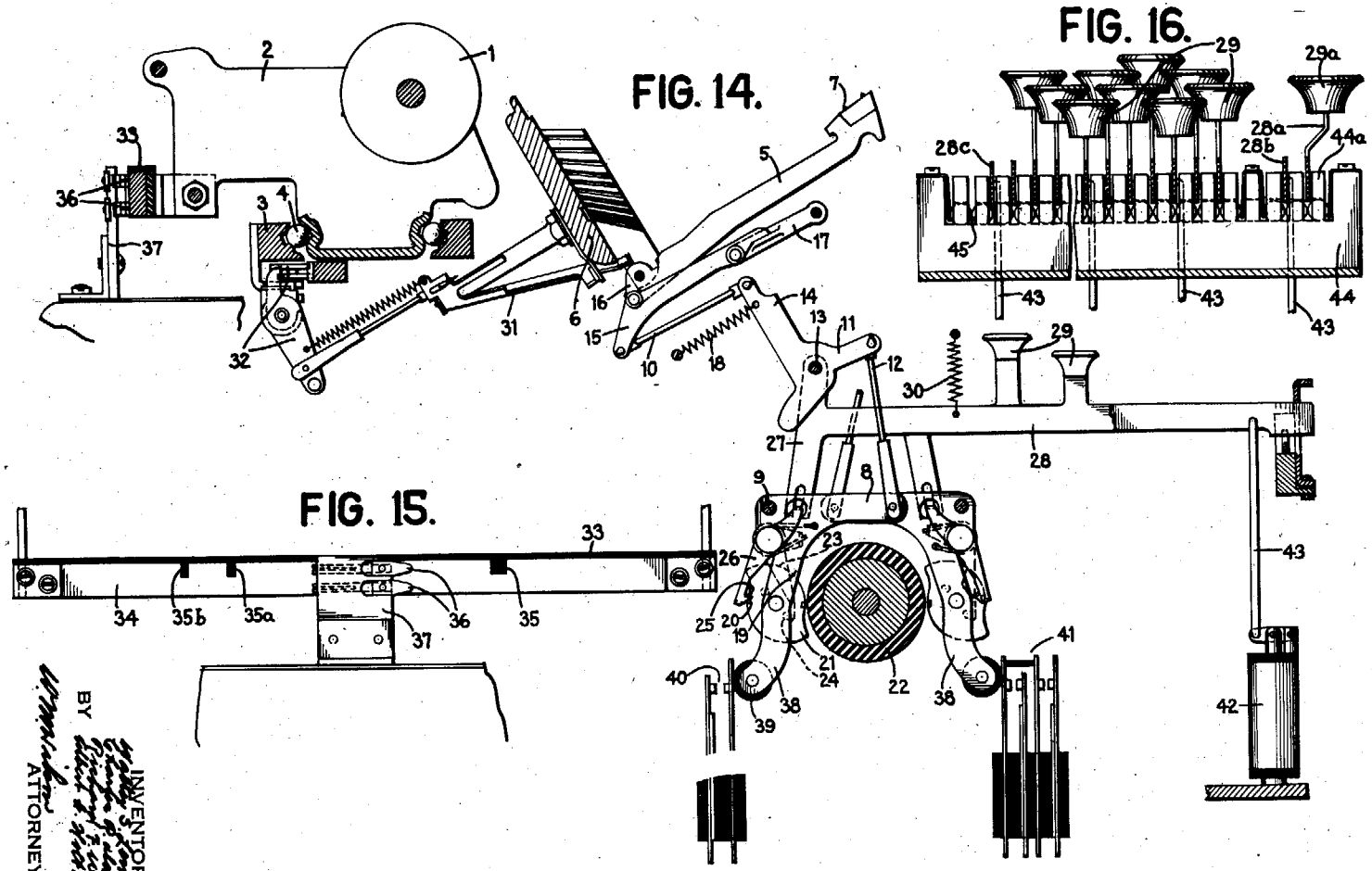
INVENTORS
Walter S. Lemmon
Charles A. Lake
Richard F. Wolz
Albert E. Hill
BY
W. M. Wilson
ATTORNEY

SYSTEM OF CODING AND DECODING

Original Filed May 22, 1936 16 Sheets-Sheet 8

INVENTORS
Walter S. Lemmon
Charles P. Olds
Richard T. Wade
Albert E. Hart
BY
W. M. Wilson
ATTORNEY

SYSTEM OF CODING AND DECODING

Original Filed May 22, 1936 16 Sheets-Sheet 9

INVENTORS
Walter S. Lemmon
Charles A. Lohr
Richard H. Wells
Albert E. Hall
BY
W. W. Wilson
ATTORNEY

SYSTEM OF CODING AND DECODING

Original Filed May 22, 1936 16 Sheets-Sheet 10

SYSTEM OF CODING AND DECODING

Original Filed May 22, 1936 16 Sheets-Sheet 11

INVENTORS
Walter S. Lemmon
Charles R. Wirts
Richard F. Ritz
Robert E. Roth

BY W. M. Gibson
ATTORNEY

SYSTEM OF CODING AND DECODING

Original Filed May 22, 1936 16 Sheets-Sheet 12

INVENTORS
Walter S. Lemmon
Charles R. Wirt
Richard F. Wolf
Albert E. Wolf

BY W. M. Liston
ATTORNEY

SYSTEM OF CODING AND DECODING

Original Filed May 22, 1936 16 Sheets-Sheet 13

INVENTORS
W. Walter S. Lemmon
Charles P. Stutz
Richard F. Walz
Talbot C. Wolf
BY
W. M. Lee
ATTORNEY INVENTORS
Walter S. Lemmon
Charles A. Wolf
Richard F. Wolfe
Albert E. Wolf
BY
W. M. Nelson
ATTORNEY

SYSTEM OF CODING AND DECODING

Original Filed May 22, 1936 16 Sheets-Sheet 15

INVENTORS
Wesley S. Lemmon
Charles R. Hoag
Richard F. Wolf
Albert G. Kolb

BY W. M. Nielsen
ATTORNEY

SYSTEM OF CODING AND DECODING

Original Filed May 22, 1936 16 Sheets-Sheet 16

INVENTORS
Walter S. Lemmon
Charles R. Aldt
Richard F. Lewis
Albert E. Keck
BY W. M. Wilson
ATTORNEY Reissued July 25, 1944

Re. 22,523

UNITED STATES PATENT OFFICE 22,523

SYSTEM OF CODING AND DECODING

Walter S. Lemmon, Riverside, Conn., Charles R. Doty, Yonkers, N. Y., and Richard F. Walz, Glen Ridge, and Albert C. Holt, Oradell, N. J., assignors to International Business Machines Corporation, New York, N. Y., a corporation of New York Original No. 2,138,639, dated November 29, 1938, Serial No. 81,178, May 22, 1936. Application for reissue September 18, 1943, Serial No. 502,998

63 Claims. (Cl. 197—4)

This invention relates to the art of secret writing and more particularly to a new system for transforming language messages into decodable secret code.

An object of the present invention is to provide an improved system for the more rapid and accurate coding and decoding of characters or signs used in various communications.

Another object of the invention is to prevent periodical recurrences by causing irregularities in the coding process by a new system so as to introduce a new order of complexity of code according to an arbitrary system.

A further object of the invention is to produce a resultant which is most complex but whereby the coding and decoding operations are simplified.

Still another object of the invention is to provide an apparatus which will automatically code a message as a result of the mere typing of the uncoded message, and which will automatically decode the message as a result of the mere typing of the coded message.

Heretofore, in order to prevent periodical recurrences in forming unintelligible sequences of characters in a coded message and to insure a continuous variation and transposition of the resultant character form, the electrical recording and indicating systems producing such effects, at present, employ a plurality or multiplicity of coding drums or wheels which are adapted to be actuated differentially to alter the circuit connections of the system. It has been found that systems of this type are apt to become quite complicated and tend to reduce the over-all rate of speed of operation and efficiency of the systems.

In contradistinction to the present systems, the invention to be disclosed is based on the principle of a copending application, Serial No. 39,294, filed September 5, 1935, in which a single coding commutator or circuit changing device for a series of characters or signs is employed and to which, at variable times, a definite movement is imparted to alter, at irregular intervals, the circuit connections of the system. The complete series of characters or signs to be employed in a system may be connected to a single circuit changing device or may be divided into separate groups of characters and signs, and employ a circuit changing device for each designated group and treat each group device as a single coding commutator to further complicate the resultant coded message. For the purpose of obtaining operation at irregular intervals of a coding commutator or wheel, control means are provided to shift the coding or typing circuits in an odd manner and in accordance with a varying and arbitrary pattern.

In addition thereto, provision is made whereby the character sequence of the coding commutator is altered automatically to further increase the resistance of the coded message.

Other features and objects of the present invention are: to type the message in clear text and in a coded form simultaneously; to insert portions of a message in clear text at both the typing and coding positions; independent control means for the coding commutators to separately and irregularly position each commutator; the method of controlling the various control elements depending upon the frequency of operation of the operating or primary unit; the commutator control means being provided with removable control elements, and including means whereby certain control units thereof may be variably and arbitrarily positioned; means to lock the carriage return mechanism during the typing cycles; means to lock the character keyboard and release the carriage return mechanism at the end of a predetermined copy; error detecting circuits to prevent release of carriage return mechanism if control units failed to respond correctly during the typing of the predetermined copy; means to lock the keyboard and carriage return upon completion of a group of lines of predetermined copy; test key operation to return carriages automatically to left margin position if control units functioned correctly; recording at both units a symbol indicative of correct functioning on both clear and coded copies of text; error key operation if error was made in functioning of the control elements during the typing of said group of copy; re-alignment of coding control units to last text position, if error made; recording a symbol indicative of error function on both copies; at end of group and if coding units functioned properly, additional coding control units to be actuated, if an error had been made the said coding control units are not actuated; insertion of automatic spacing in coded text; substitution of additional character for space character in coding operation and provision to render the said additional characters ineffective in decoding; certain coding control elements operated upon recording of every character; multi-position key to control types of coding and decoding and insertion of clear text on both copies at any time; single control key means for changing from coding to decoding and vice-versa; reset key means to realign all the coding control elements to a normal reference point; dialing means to alter the normal reference point.

Further and other objects and advantages will be hereinafter set forth in the accompanying specification and claims, and shown in the drawings, which by way of illustration show what is now considered to be the preferred embodiment of the invention.

Figs. 4 to 8 inclusive show the construction of the coding commutators.

Figures 1, 8, 9:
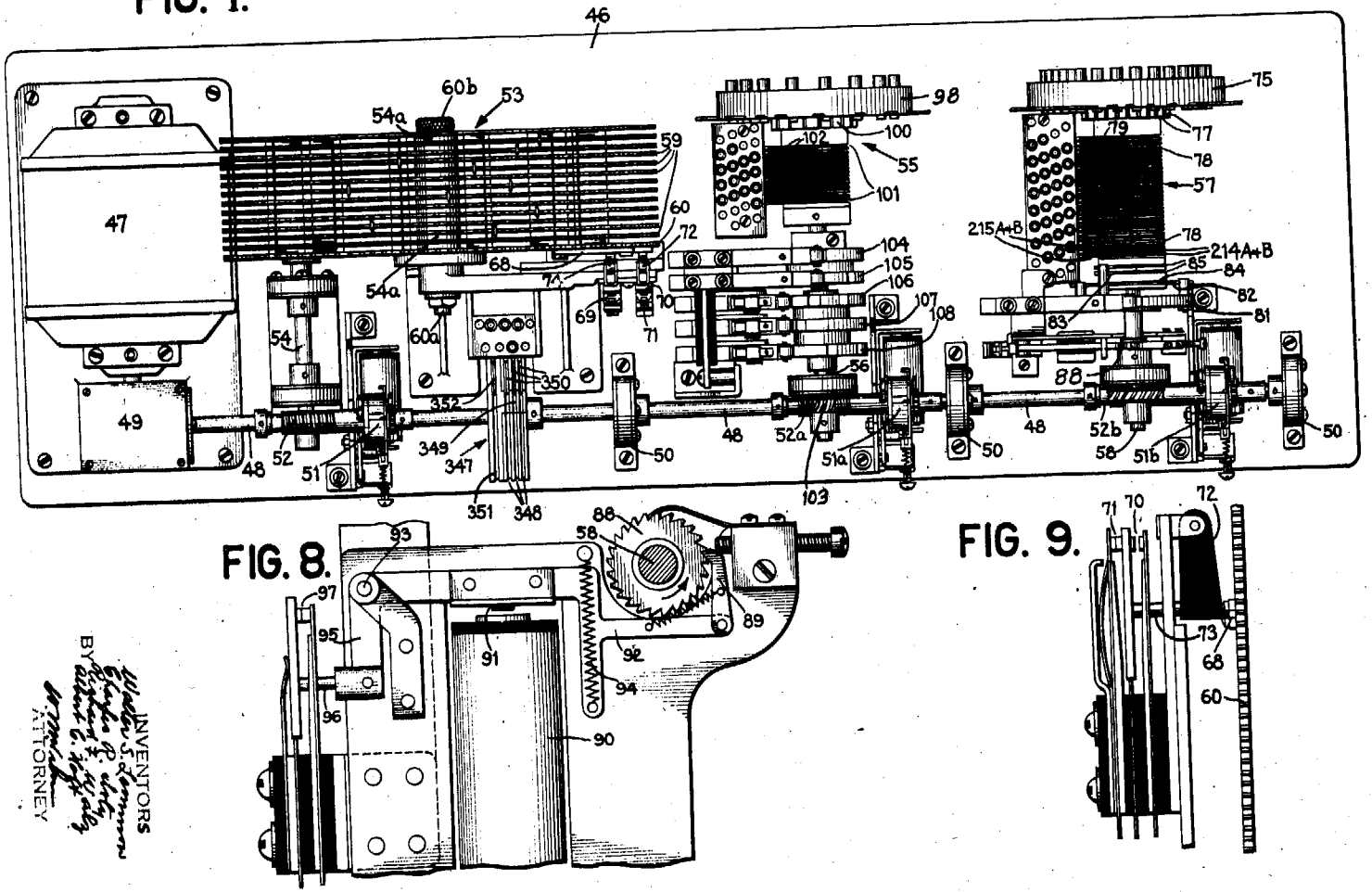
Fig. 1 is a plan view of the power operated coding control elements.

Fig. 9 is a detailed contact arrangement of the coding commutator control device.

Figure 10:
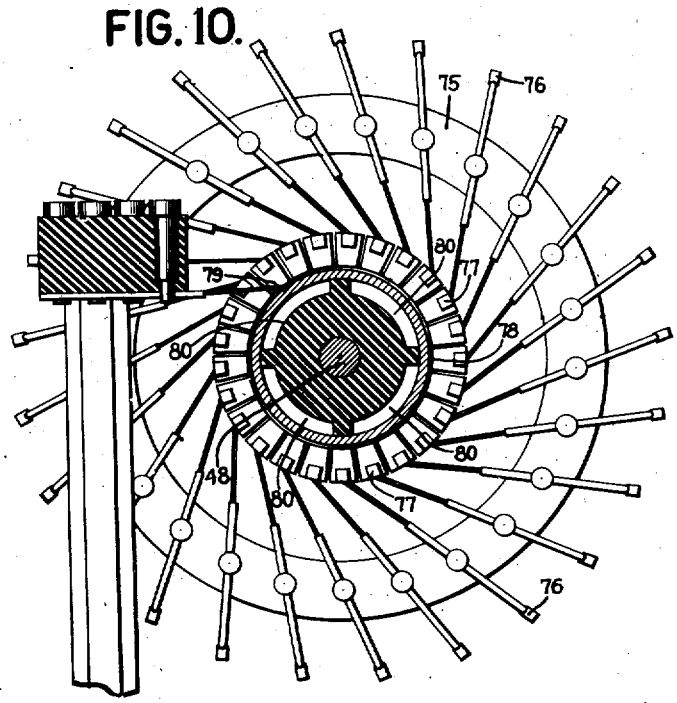

Fig. 10 shows the brush arrangement of the coding commutators.

Figure 11:
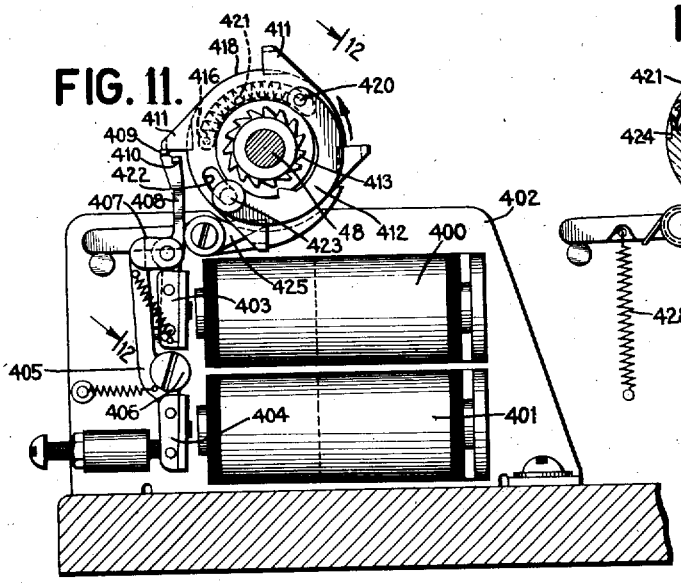
Figure 13:
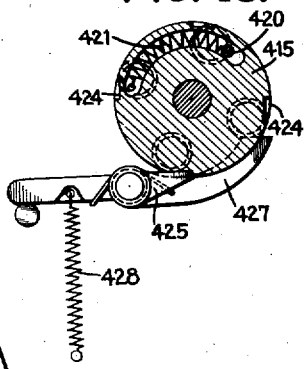
Figure 12:
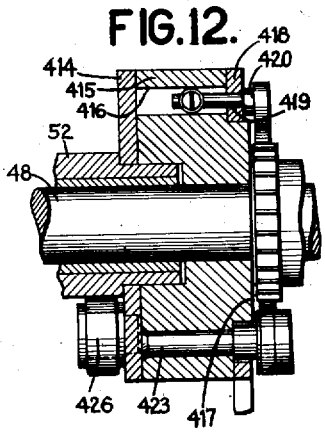

Figs. 11 to 13 show in detail the clutch control units.

Fig. 14 is a fragmentary sectional elevation illustrating a portion of a power operated typewriter including certain control features.

Fig. 15 is a detail view of the carriage contact bar and brush arrangement.

Fig. 16 is a detail view of the keyboard locking arrangement.

Figure 17:
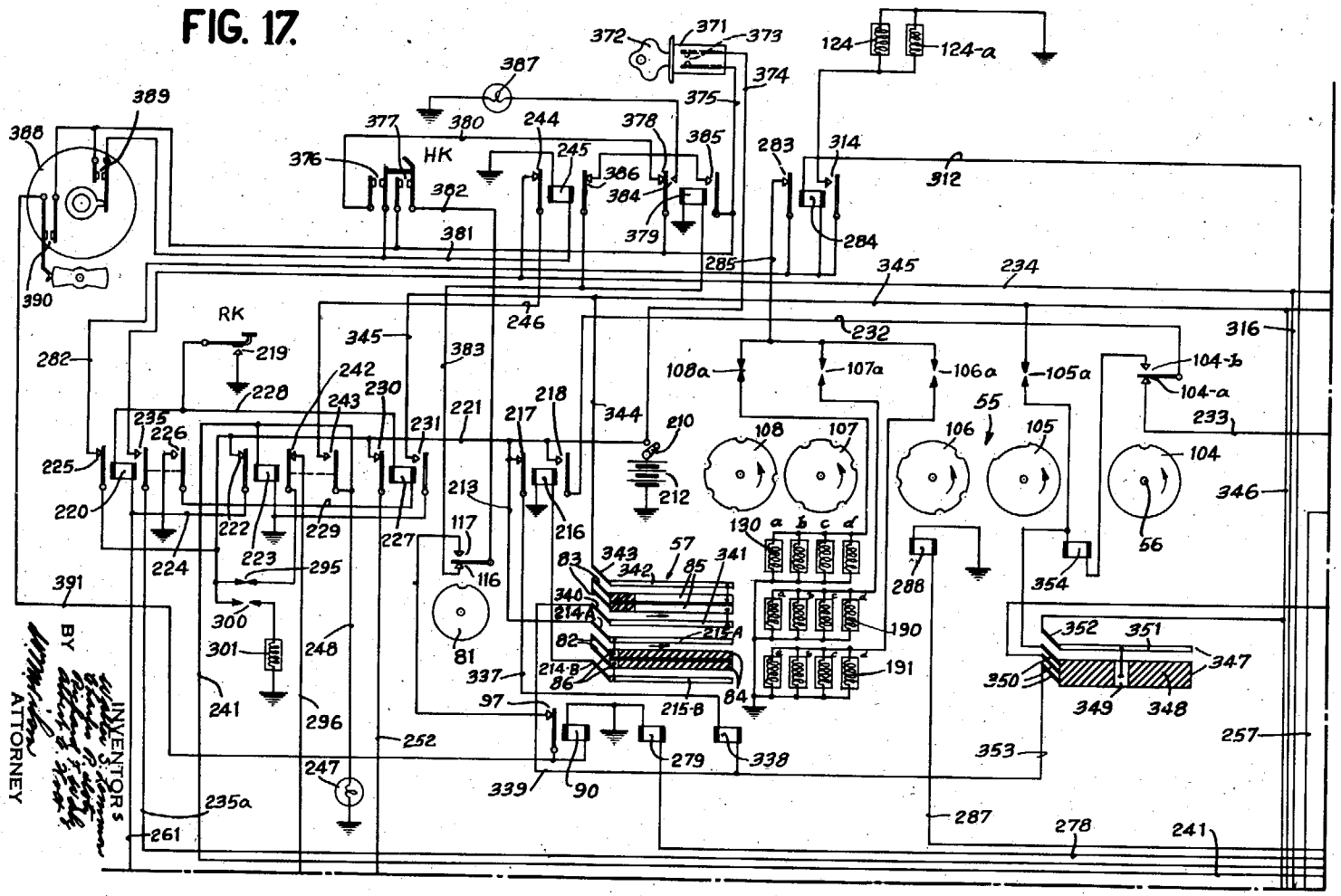
Figure 17A:
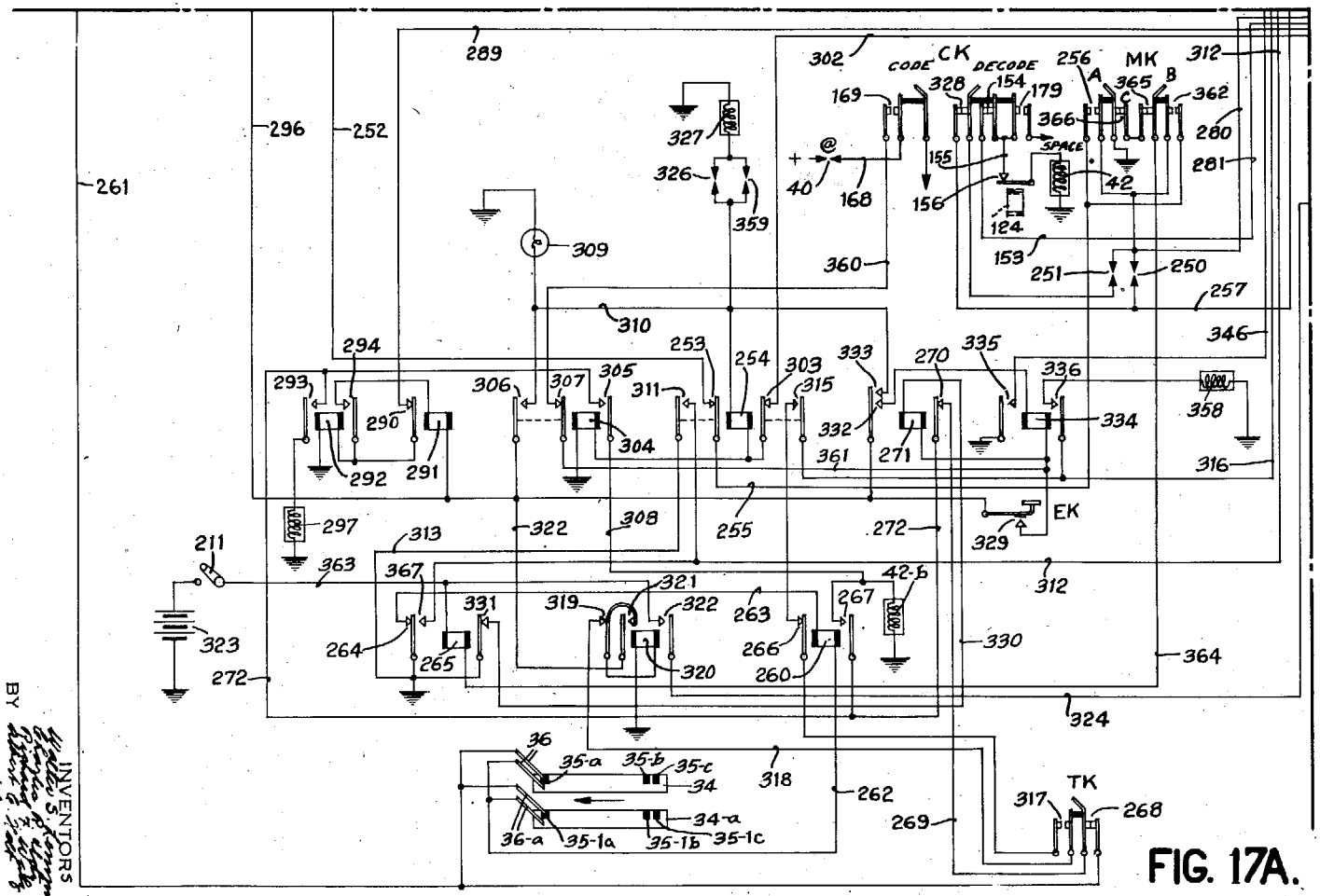
Figure 17B:
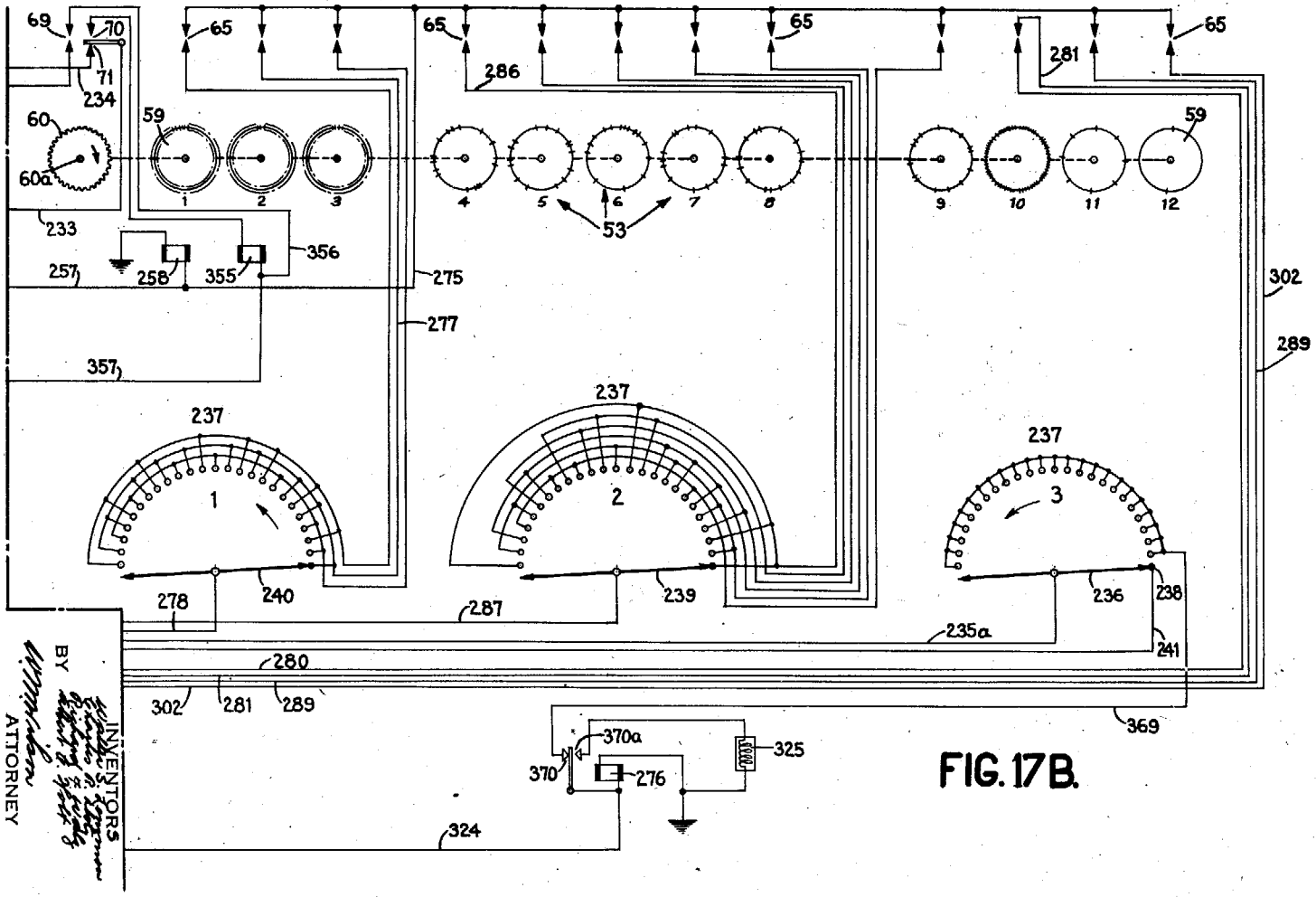

Figs. 17, 17A and 17B show the circuit arrangement for controlling the coding control elements.

Figures 3, 18, 19:
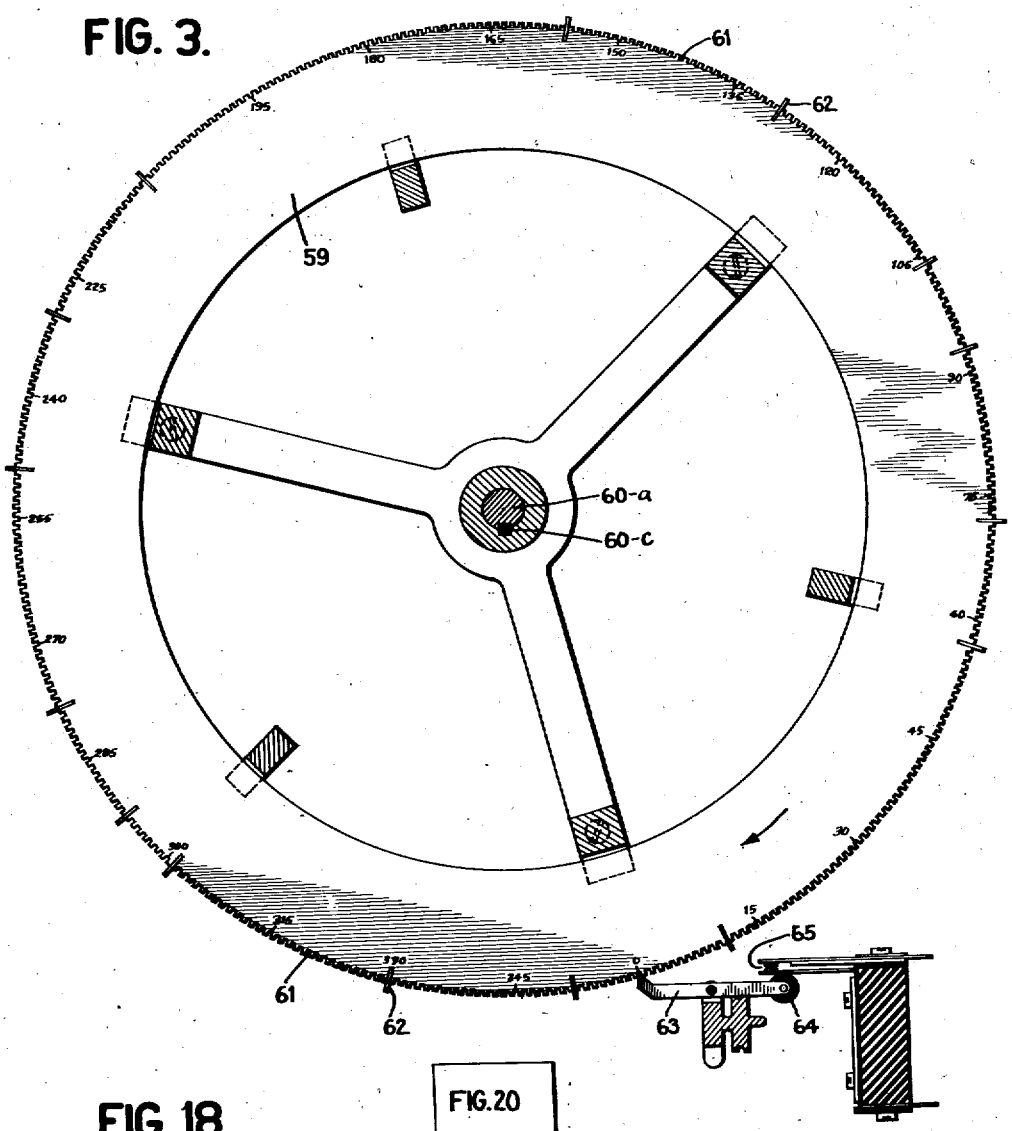
Fig. 3 is a detail of one of the control elements of the commutator control device.

Fig. 18 shows the correct figure layout for Figs. 17, 17A and 17B.

Fig. 19 shows the correct figure layout for Figs. 20, 20A to 20D.

Figs. 20, 20A to 20D show a preferred arrangement of the typing circuits for coding and decoding operations.

Figure 21:
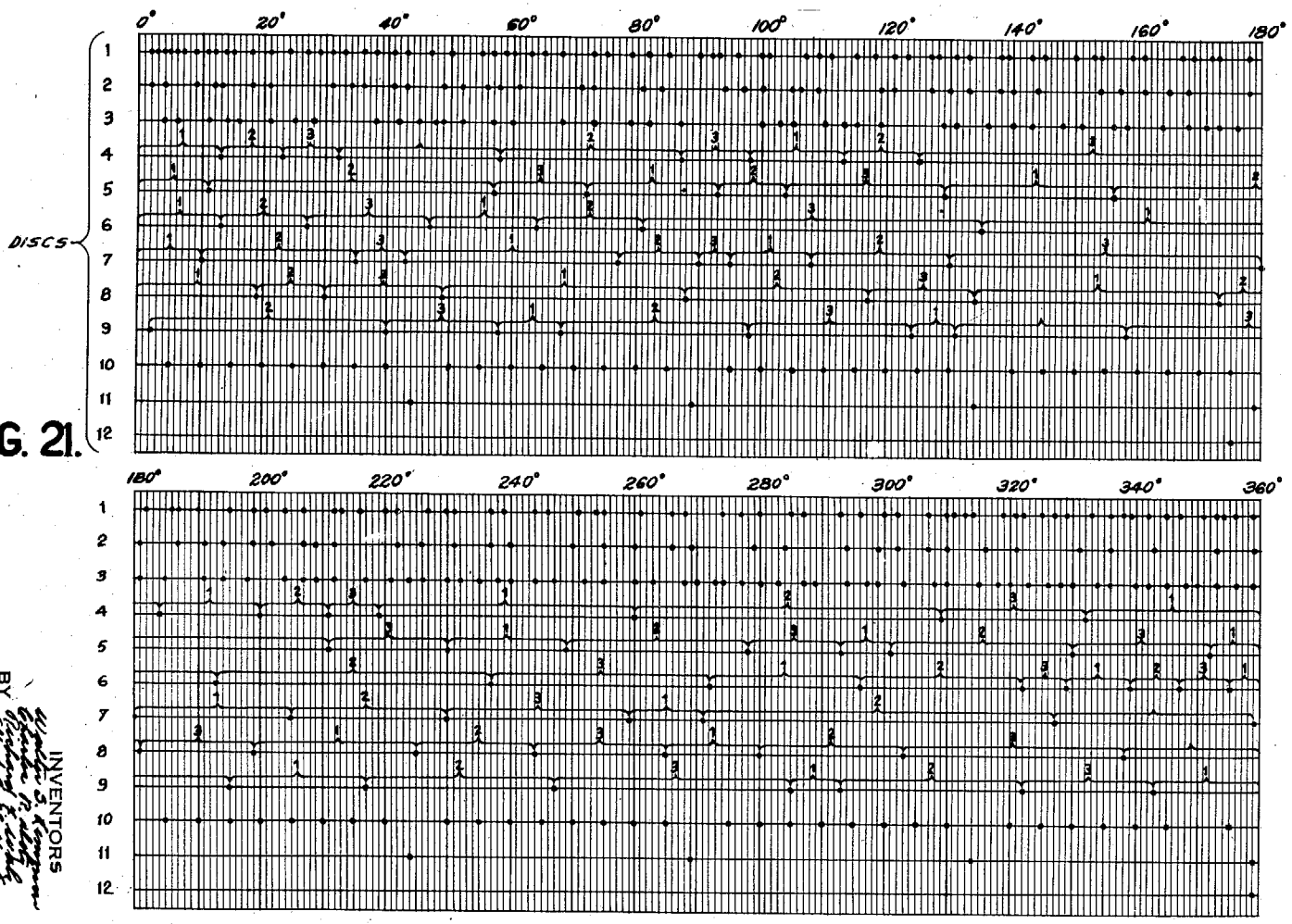

Fig. 21 is a layout of the plug arrangement for the coding commutator control device.

The illustrative embodiment of the invention includes two typewriters to be interconnected for coding purposes. The apparatus is effective, when the uncoded message is typed, to produce both a correct writing of the bopy and a writing of the same message in code, and, when the coded message is typed, to produce a correct writing of the code message for comparison with the copy and a correctly typed translation of the code message. To present the invention as briefly and concisely as possible, the independent control units of the system will be described first and followed by a description of the circuit arrangements and operation of the system.

*Recording units*

The system as illustrated herein comprises a primary typewriter, upon which the messages to be translated are typed and recorded and may be designated as the operating unit, and a secondary typewriter or translating unit for translating and recording messages typed on the primary or operating unit. Any standard typing unit may be used; however, it is preferred to employ the electromatic type. Said units comprise a revoluble platen 1 mounted in the frame of a carriage 2 which is mounted for movement transversely of the frame 3 of the machine on anti-friction bearings 4 arranged in guideways provided therefor in the carriage and frame of the machine (refer to Fig. 14).

Type bars 5 are pivoted in a type basket 6 in the frame of the machine and are provided with types 7 adjacent their free ends adapted to engage the platen or the work sheet thereon when the type bars are swung on their pivots. Power driven devices are provided for operating the type bars or other printing instrumentalities of the machine. Said devices comprise actuators in the form of bell crank levers 8 pivoted on a common pivot rod 9 and having one arm connected with an arm of a bell crank lever 11 by means of the link 12. The bell crank lever 11 is pivoted on the common pivot rod 13 and its other arm 14 is connected with the free end of a toggle lever 15 by means of a link 10. The lever 15 is pivoted to the arm 16 of the type bar, and at its other end is pivotally connected with the free end of a toggle link 17 pivoted on a fixed part of the frame. A spring 18 connects the arm 14 of the bell crank with a fixed part of the frame and resiliently maintains the parts in the normal position as shown in the figure of the drawings, in which the type bar is retracted and the toggle 15, 17 is in straightened position. When the actuator lever 8 is swung to pull the link 12, it operates to swing the lever 15 in a direction to break the toggle and swing the type bar into printing engagement with the platen.

The bell crank 8 has an arm 19 projecting downwardly on the free end of which a cam 21 is revolubly mounted adjacent to the surface of a power driven roller 22. A spring-pressed arm 23 engages a lug 24 on the cam and tends to swing it on its pivot into engagement with the roller or a projection 20 thereon into engagement with a stop 25 on a detent lever 26 pivoted on the bell crank 8. At its upper end, the lever 26 has a lateral projection whereby it is engaged by the slotted end of an arm 27 projecting downwardly from a key lever 28.

The key lever is pivoted on the common pivot rod 13 and has a key 29 whereby it may be manually operated. A spring 30 connects the key lever with a fixed part and resiliently maintains the key lever and parts connected therewith in the normal position as shown. When the key is depressed, it swings the detent lever to move its stop 25 out of the path of the projection 20 and permits the cam to turn under the action of the arm 23 into engagement with the roller. The cam is then rotated by the roller and swings the lever 8 to swing the bell crank 11, which swings the type bar into engagement with the platen. When the type bar is actuated to print, it engages the universal bar 31 to release the escapement mechanism, shown generally at 32, of the carriage 2. The parts thus far described are, or may be, of usual construction and form no part of the present invention except as they enter into combination therewith.

Attached to the rear section of the carriage 2 is a transverse bar 33 preferably of insulating material, the said bar is adapted to extend the entire length of the carriage. Superimposed thereupon is a conducting bar or segment 34 having a plurality of slots 35 formed therein to expose sections of the insulating member 33 as shown in Fig. 15 of the drawings. A pair of brushes 36 supported in a fixed bracket 37, which is attached to and supported by the frame of the typewriter, are adapted to cooperate with the contact bar 34. The slotted or insulated sections of the contact bar are so arranged that when the typewriter carriage is positioned to start typing on the work copy, that is, when the carriage is at the left margin position, the slot 35 is positioned so that one of the brushes 36 engages the insulated section 33.

Similarly, after the typing of a number of characters, or signs, for example 45 characters, the slotted section 35a will be positioned so that one of the brushes 36 engages the insulated section 33 and likewise after typing an additional number of characters, again, for example, 8 characters, or signs, the slotted section 35b will be positioned so that one of the brushes 36 engages the insulated section 33. Therefore, it will be understood that the carriage position at the left margin position or after typing 45 or 53 characters or signs is effective to open the circuits connected to the said brushes. It is to be noted that the carriage position contact arrangement is provided on both the primary or operating unit and the secondary or translating unit, the purpose of which will be understood as the description progresses.

Attached to the free end of arm 19 of bell crank lever 8 is a bracket 38 supporting a follower roller 39 which is adapted to actuate the spring blade of suitably positioned contacts 40 or 41 to close said contacts when the said cam 21, controlled by a corresponding key 29, is released and actuated by the power driven roller 22. The single and double types of contact arrangements are shown cooperating with the said roller 39 for the reason that certain keys upon their depression control several different circuit arrangements which will be explained later herein.

Provision is made to operate the key bars 28 automatically by the solenoids 42 supported by the frame of the unit which are connected to the key bars by links 43. It is also desirable to provide means for locking all the keys against depression except the key bar depressed. To this end, a slotted trough or member 44 is arranged beneath the key board section of the unit. Arranged in the trough is a plurality of rollers 45.

The combined diameter of the rollers 45 is such that they contact each other and the ends of the trough when a key bar is depressed and inserted between two adjacent rollers. It will be noted that by this arrangement it is impossible to depress two keys at one time, or to depress another key bar while a key bar is depressed. At certain intervals during the operation of the system it is desired to lock the keyboard so that certain character and sign key bars cannot be depressed, yet permitting certain other key bars to be free to be depressed. And at other intervals it is desirable to lock the entire keyboard preventing the depression of any of the character or sign keys. To accomplish this, the keyboard may be divided into several sections with corresponding key bar locking means. For example, the carriage return key 29a and its key bar 28a are provided to be controlled separately; to this end, a separate trough section 44a is provided, and cooperating with the rollers of this section is shown a dummy key bar 28b which upon depression by a corresponding solenoid and link arrangement 43 prevents the carriage return key from being depressed. It is possible to utilize existing key bars as dummy key bars without providing additional ones therefor, such as the key bars for the back spacer or tabular keys. Similarly, dummy key bar 28c, controlled by a solenoid and connecting link 43, is adapted, upon its depression to lock the entire remaining section of the keyboard, preventing the depression of any of the keys 29.

*General layout description of controlling units*

Referring now to Fig. 1 of the drawings, a brief description of the layout of the power driven controlling units will be given. Supported on a suitable main base 46 is a driving motor 47 which is connected to a main drive shaft 48 through a suitable gearing arrangement and shown as a gear box 49. The said main shaft is suitably supported by the bearing frames 50. Clutch units 51 which will be described hereinafter are provided and positioned along the shaft 48 and adapted to transmit power to separate units through its associated worm sleeve 52 when the clutch unit is actuated. A coding commutator control means, generally designated 53, is mounted on the main base 46 and adapted to be driven by the main shaft through an intermediate shaft 54. A coding commutator 55 for one group of characters or signs in the series is provided and adapted to be driven by the main shaft through the associated intermediate shaft 56. A second coding commutator 57 for another group of characters or signs in the series is provided and adapted to be driven by the main shaft through the intermediate shaft 58 associated therewith. It is to be understood that one coding commutator could be provided for the entire series of characters and for signs to be included in the system. Whenever the case is such that two or more separate coding commutators are provided for separate groups of the characters or signs of the series, it is not to be confused with the multiple coding commutator arrangement usually in cascade which are arranged so that one commutator, which must provide for the entire series of characters, is positioned with respect to another adjacent or cooperating coding commutator which likewise must provide for the entire series of characters.

In the present invention, each coding commutator controls a predetermined group of characters of the entire series of characters and are controlled and positioned separately and not with respect to each other to control the alteration of control circuits for coding purposes. Each coding commutator controls the coding or typing circuits separately and not in a series relationship. The individual controlling units will now be briefly described.

*Clutch units*

Referring now to Figs. 1, 2, 11, 12 and 13 the clutch unit 51 associated with the coding commutator control device 53 will be described, however it is to be understood that the description thereof also applies to the clutch units 51a and 51b associated with the coding commutators. The clutch units are provided to impart a step by step movement to the associated mechanisms at certain intervals and at other intervals to impart a continuous movement or rotation to the said mechanisms, depending solely upon the controlling impulse, and are similar in construction to the clutch described in a copending Patent 2,116,683 granted May 10, 1938. In addition thereto, it has been found that to insure a more positive operation of the system, the step by step movement is not imparted to the said connected mechanism until the decay of the control impulse, that is upon the deenergization of the controlling electromagnetic means. In contradistinction thereto the continuous operation of the clutch is effected directly upon the initiation of the impulse, that is, upon the energization of the controlling electromagnetic means.

The said controlling electromagnetic means comprises two electromagnets 400 and 401 suitably supported by a plate 402, and the associated armatures 403 and 404 respectively. The armature 404 is secured to or may form an integral part of the extension member 405 pivotally mounted on the plate 402 at 406. An arm 407 is provided at one extremity of the member 405 and adapted to pivotally support an extension arm 408 which at the lowest extremity has secured thereto the armature 403 and at its other extremity is provided with two fingers or stops 409 and 410 arranged as shown in the figures so that the stop 410 is positioned below the stop 409 but not in the same plane.

The purpose of the described arrangement is to effect the intermittent and continuous clutch operation referred to. Energization of the coil 400 which hereinafter will be referred to as the clutch operating coil causes its armature 403 to be attracted. The movement imparted to the armature 403 is sufficient to withdraw the stop 409 to permit the restrained stop pawl to advance or drop to the stop 410 as the armature is attracted, but the movement is not great enough to permit the stop pawl 411 to pass the lower stop 410 with the armature in the attracted position. Upon deenergization of the said coil 400 or upon the decay of the impulse, the armature is returned to normal position as shown permitting the stop pawl 411 to drop off the stop 410 and be advanced so that the coupling pawl 412 may be engaged with the ratchet wheel 413 to operate the clutch unit. This action is similar to the usual escapements for similar devices. Ratchet 413 is mounted on the continuously rotated shaft 48. Rotatably mounted on the said shaft is a worm sleeve section 52 which may be secured or be an integral part of disc 414 which is suitably attached to the clutch drum 415.

The said drum rotatably mounted on shaft 48 is provided with an arcuate opening 416 and also is adapted to revolubly support on the shoulder 417 a plate 418. The said plate is provided with a plurality of stop pawls 411, in the figures as shown four are provided. The plate 418 is provided with two openings, one opening at 419 so that a pin 420 pivotally attached to one end of coupling pawl 412 may be inserted therethrough to extend into the arcuate opening of the drum 415 wherein the spring 421 which is attached at one end to the drum section and at the other end to the said inserted pin 420. The other opening 422 in the plate is an elongated one as shown through which a pin 423 is inserted and secured to the drum 415. The free end of pin 423 has one extremity of the coupling pawl pivotally mounted thereon. The drum 415 is also provided with a plurality of recesses or notches 424 adapted to be engaged by a spring pressed pawl 425 mounted on plate 402, the purpose of which is to lock the clutch in its inoperative position when engaged by the said pawl. A plurality of cam rollers 426 are mounted on the disc 414 and are engaged by an arm 427 pivotally mounted on plate 402 and used to engage the cam rollers through the agency of spring 428. It is seen from the position of the various clutch elements in Fig. 11, that when the stop pawl is released by stop 409, the spring 421 through the pin 420 urges the plate 418 to be advanced, this movement is restrained by stop 410 before the plate 418 is advanced far enough to permit the coupling pawl 412 to engage one of the teeth of ratchet 413. However when the armature is restored to normal position and the stop pawl is again released by stop 410, the spring 421 urges the plate 418 forward to such an extent as permitted by elongated opening 422 which is sufficient to permit the coupling action, causing the sleeve section 52, drum 415, plate 418, pawl 412 and ratchet 413 to rotate in unison.

It is seen that the clutch unit is prevented from being rotated more than one quarter of a revolution. This is due to the stop pawl 411 arrangement. Upon completion of the quarter revolution rotation of the unit one of the stop pawls 411 engages the stop 409 which in the normal position is in the path of the stop pawls to disengage the coupling pawl 412. At the moment of contact of stop pawl and the stop the coupling pawl is still engaged to drive the drum 415. The slight addition rotation of the drum causes the pawl 412 to be lifted out of engagement with the ratchet teeth because when the plate 418 is blocked or restrained by stop 409, the pin 420 then becomes a fixed axis or pivot for the coupling pawl the other end of which is advanced in a forward direction due to drum 415 and the pin 423. An additional movement is imparted to the drum section 415 after declutching has been effected by the action of the spring pressed arm 427 on one of the cam rollers 426. The purpose of this additional movement is to advance the drum 415 ahead so that the pawl 425 engages the notches 424 in the said drum to lock it in the declutched or inoperative position.

The description thus far related to the intermittent or step by step rotation of the clutch mechanism effected upon the decay of the control impulse. For continuous operation of the clutch to be effected when the impulse is initiated and impressed on the coil 401, it is seen that the armature 404 is attracted. The movement imparted thereto is sufficient to permit the stop pawl 411 engaged by the stop 409 to pass the stops 409 and 410 on the arm 408 which in turn is supported on the extension arm 405.

The release of stop pawl 411 permits the plate 418 to be advanced to effect coupling of the pawl 412 and ratchet 413 which was just described. Upon deenergization of the coil 401 the armature 404 is restored to the normal position shown in Fig. 11 to block or restrain further movement of the plate 418 and thus effect the declutching operation set forth.

The worm sleeve section 52 engages the worm gear 67 (Fig. 2) to drive the attached mechanism which will now be explained.

*Coding commutator control means*

Figure 2:
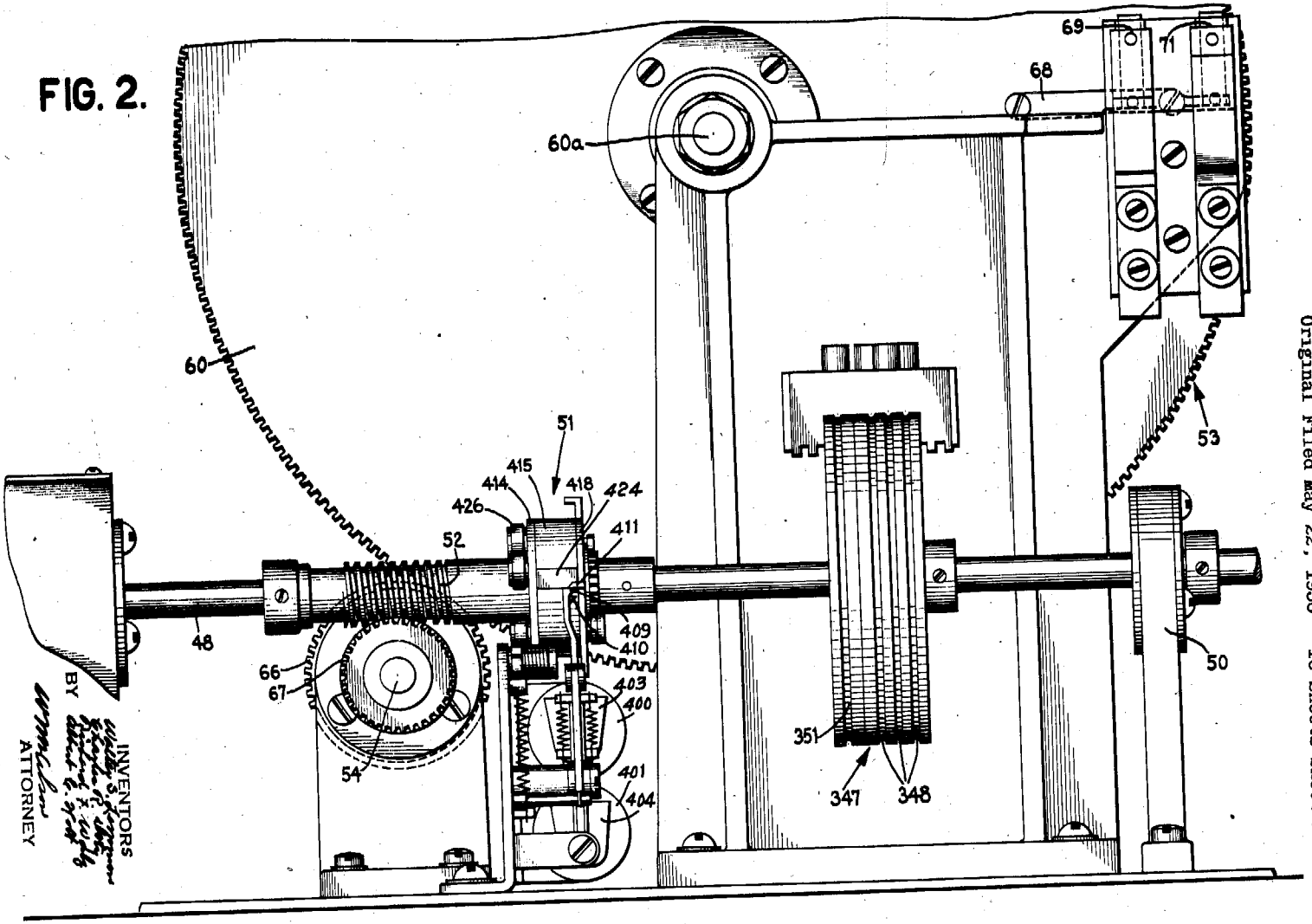
Fig. 2 is a detailed view of the coding commutators control device.

Referring now to Figs. 1, 2 and 3 of the drawings, the coding commutator control means, generally designated 53, will be described. This device, which will be hereinafter referred to as a program device, is explained in detail in Patent No. 1,791,927, dated February 10, 1931, therefore, the following brief description will suffice.

The program device comprises a plurality of control discs 59 mounted on a common shaft 60a. On the same shaft with discs 59 is a large gear 60. The said gear is secured to the shaft 60a so as to rotate it upon actuation of the gear. The individual discs 59 are mounted on said shaft so that each and every disc may be removed at will and replaced by other discs as desired, and are adapted to be rotated by the fixed key 60c provided on said shaft. The individual discs are placed in a suitably spaced relation on the shaft as shown in Fig. 1 of the drawings, the washers 54a serving as the spacing means. The discs and washers are then held securably in place by the knurled nut 60b which is adapted to be screwed on the shaft 60a.

The discs are notched, as at 61, at equally spaced intervals about their entire circumferences to receive pins or plugs 62 which are adapted, as the disc is rotated, to engage the pivoted arm 63 provided at one end thereof with a follower roller 64, depressing said arm and raising the roller to close the spring contacts 65 which are suitably supported to the main base 46. There are twelve control discs 59 provided in the present invention and individual associated contacts 65 are provided for each disc and adapted to be operated by the plugs 62 arranged in notches 61 in an arbitrary manner. As shown in Fig. 3 of the drawings, the discs 59 are arranged with 360 notches around the circumference thereof so that a plug 62 could be positioned at each and every degree thereof. A suitable plug arrangement for the various discs is shown in Fig. 21 of the drawings.

Associated with the large gear 60 is gear 66 secured to the intermediate shaft 54, at one end of which is attached a worm gear 67 engaging the worm sleeve 52 of the clutch unit 51. It is obvious from the description thus far that each time the clutch unit is released the constantly rotating main shaft 48 drives the worm sleeve 52 and shaft 54 to rotate the large gear 60 and discs 59 during the interval the clutch unit is operated. The clutch unit 51, when operated by the operating coil thereof, is adapted to be operated for a predetermined timed interval so as to rotate the large gear 60 and discs 59 through an arc of one degree. It is to be noted therefore that the discs 59 can be positioned 360 times during one revolution thereof.

The program device is shown in Fig. 1 to be in the normal or home position which will be referred to as a common reference point from which all operations of the system are based. In the home position of the program device, a cam section 68 attached to the large gear 60 is adapted to maintain contacts 69 open and contacts 70 open and contactst 71 closed. The cam section, as the gear 60 is rotated and approaches home position, is adapted to actuate the pivoted arm 72 (see Fig. 9) and swing it away from the gear 60 to close contacts 71 and open contacts 70 by means of the pin rod 73. A similar pivoted arm 74 is adapted to open contacts 69 when the cam section 68 engages said arm. The surfaces of the cam section are made so that contacts 71 are closed at the home position and opened when the program device is stepped ahead one degree or step and remain so for the remaining part of the cycle or revolution of the device.

Contacts 70 are opened at the home position and closed for the remaining 359 degrees or steps of the cycle.

Contacts 69 are opened at the home position and close immediately upon the first step imparted to the program device and remain closed for 357 steps and then are opened for the 358th, 359th and 360th steps or degrees of the cycle.

*Coding commutator assembly*

It was mentioned hereinbefore that the preferred arrangement is such that a plurality of coding commutators are provided for different groups of the characters and signs of the entire series of characters and signs. Using the characters and signs of the English language as one example of a series of characters and signs, the embodiment of the invention herein will be shown to utilize two coding commutators, one to control the coding or typing circuits for the numerals and various signs to be used in the system and another to control the coding or typing circuits for the letters of the English alphabet to be used. Hereinafter the coding commutators will be referred to as scrambler units or scramblers; namely, numeral scrambler and alphabet scrambler.

Referring now to Figs. 1, 6, 7, 8, and 10, the alphabet scrambler is shown to comprise a stationary insulating ring member 75 adapted to support a plurality of individual brushes 76 arranged to engage individual insulated conducting segments 77. The commutator section, comprising segments 77, is secured to shaft 58 and adapted to be rotated thereby, upon operation of the clutch unit 51b, by means of the worm sleeve 52b and worm gear 58a attached to the shaft 58. The number of brushes and conducting segments provided is to correspond to the number of characters included in the group associated therewith. In the example set forth herein, twenty-five brushes and segments are provided in the alphabet scrambler. In addition thereto, individual slip rings 78 insulated from one another are provided to be engaged by associated brushes 79.

The slip rings are connected separately to a corresponding segment 77 and are secured to shaft 58 so as to be rotated thereby. The connecting wires (not shown) may be disposed in the transverse channels 80. Circuit changing devices of this nature are old in the art and therefore it is believed not necessary to describe the alphabet scrambler more specifically. In addition thereto, a movable insulating ring member 81 is provided and has attached thereto brushes 82 and 83 which engage collecting or slip rings 84 and 85 respectively, secured to shaft 58 and adapted to be rotated by said shaft similarly to slip rings 78. With reference to Figs. 7 and 17, it is seen that the slip ring 84 is provided with but one conducting segment 86, the remaining part of the ring being insulated. The conducting segment is arranged so that the associated brushes 82 engage the segment only at the normal home position, and for the remaining part of the cycle the brushes 82 engage the insulated portion so that the connected circuits to said brushes remain open during the entire cycle except when the rings are in home position.

The rings 85 are adapted to have conducting segments for the entire cycle with the exception of the last three steps or intervals thereof. The portion or segments 87 of the rings 85 represent the insulated section for the last three steps of the cycle. The purpose of this arrangement will be understood as the description progresses.

The ring member 81 is mounted rotatably on the shaft 58 and adapted to be positioned independently thereon by the magnet and ratchet mechanism which is shown in detail in Fig. 8.

The ratchet 88 is secured to the ring member 81 and adapted to be stepped ahead by the pawl 89 upon the operation of magnet 90. It is obvious that the energization of magnet 90 attracts the armature 91 and the arm 92 attached thereto and pivoted at 93 to move the pawl 89 to be stepped ahead to engage the adjacent tooth of ratchet 88, and upon deenergization of the magnet 90 the spring 94 restores the arm 92 and pawl 89 to the normal position as shown in the figure, thereby advancing the ratchet 88 and ring member 81. It is also to be noted that upon energization of the magnet 90 and the attraction of the armature 91 and arm 92, the extension 95 of said arm is urged outwardly and the attached pin rod 96 is adapted to open the normally closed contacts 97.

The ring member 81 also has a recess 115 disposed thereon which, when the said member is in the normal home position operates the associated contacts 116 and 117 by means of the extended contact arm 118 so that the contacts 116 are closed and contacts 117 are opened. During all other positions of the ring member contacts 116 are maintained in an open position and contacts 117 are closed.

It was mentioned that twenty-five brushes and conducting segments are provided for the alphabet scrambler and therefore the ratio of the worm gear 58*a* and worm sleeve section 52*b* is such that upon operation of the operating coil of the clutch unit 51*b* the intermediate shaft 56 is advanced step by step, each step equivalent to one twenty-fifth of a complete revolution.

The numeral scrambler designated generally as 55 is provided with a stationary insulated ring member 98 carrying a plurality of brushes 99 which are adapted to engage individual commutator conducting segments 100. The conducting segments are connected to individual slip rings 101 which are engaged by brushes 102. The commutator structure for the numeral scrambler is similar to the construction of the alphabet scrambler and it is believed requires no further description, however, it should be mentioned that fifteen brushes and conducting segments are provided for this scrambler. The conducting segments 100 and slip rings 101 are secured to the intermediate shaft 56 which is rotated by the worm sleeve 52*a* and worm gear 103 when the associated clutch unit 51*a* is operated.

Fixed to the shaft 56 are a plurality of suitably spaced cam discs 104 to 108, which are included as part of the numeral scrambler. Cam discs 106 to 108 (see Figs. 5 and 17) have a number of recesses 109 disposed about the periphery of each disc. The said recesses are arranged in any arbitrary manner desired. It was mentioned that fifteen brushes and conducting segments are provided for the numeral scrambler and therefore the gearing ratio is such that upon each operation of the operating coil of the clutch unit 51*a* the intermediate shaft is advanced step-by-step each step equivalent to one fifteenth of a complete revolution.

Figure 4:
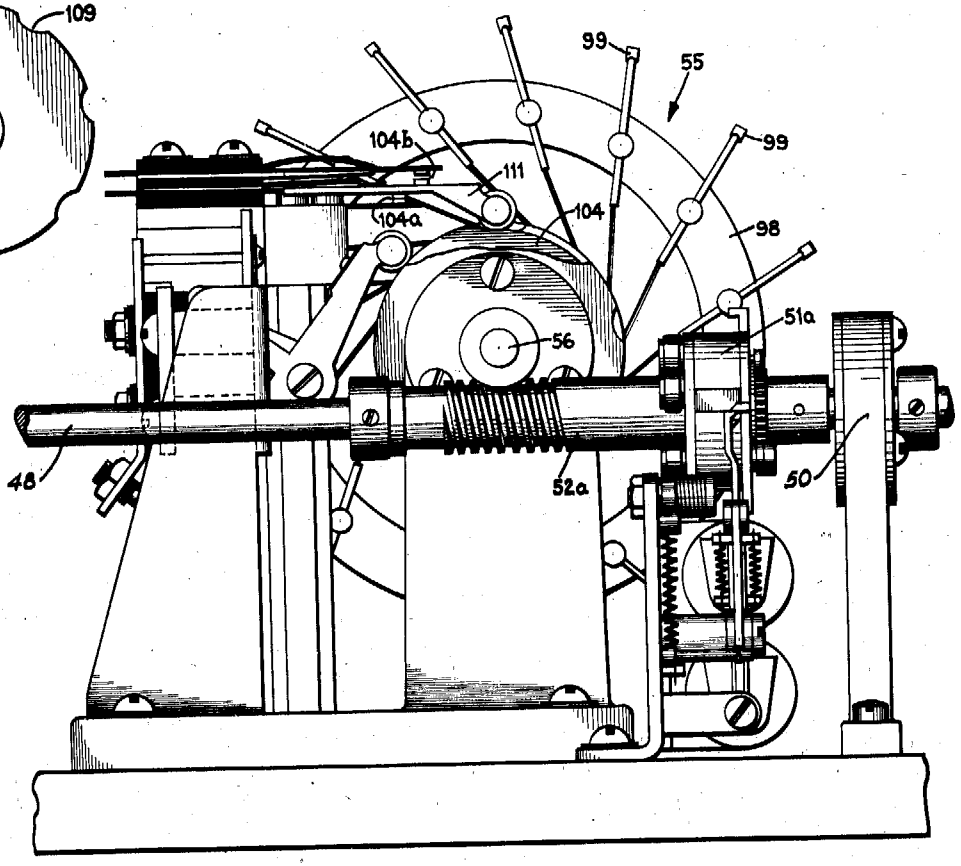
Figure 5:
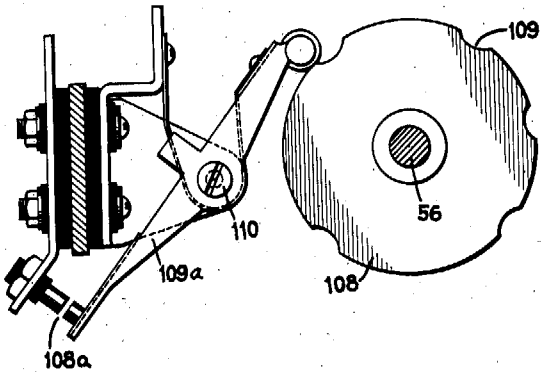

The cam discs 104 to 108 are shown to be in the normal home position in Fig. 17. It is to be noted that the recesses are so positioned that the cam operated contacts associated with discs 104, 105 and 108 are operated. With reference now to Figs. 4 and 5, one of the discs 108 is shown arranged to operate the associated contact 108*a*. Whenever the movable contact arm 109*a* pivoted at 110 engages a recess 109 in the disc, the associated contacts 108*a* are closed.

Cam disc 104 cooperates with contact arm 111 to close contacts 104*a* when the arm engages the recess therein, which it is to be noted is only in the normal home position. At all other positions of the disc 104, the arm engages the unrecessed periphery of the disc to maintain the contacts 104*b* closed and contacts 104*a* opened. Cam disc 105 is provided with an elongated recess to maintain the associated contacts 105*a* opened during the first or home position of the disc and the fourteenth and fifteenth positions thereof.

Cam 106 is provided with recesses at the third, sixth, eighth, twelfth and fourteenth positions.

Cam 107 is provided with recesses at the second, fourth, seventh, tenth and fifteenth positions.

Cam 108 is provided with recesses at the first, fifth, ninth, eleventh and thirteenth positions.

*Coding circuit arrangement*

Referring now to Figs. 20, 20A to 20D arranged as shown in Fig. 19, one method of connecting the coding or typing circuits is shown. The numeral and alphabet scramblers are shown schematically at 55 and 57 respectively. The cam operated contacts 40 of the primary or operating typewriter corresponding to the various characters and signs are connected to the individual brushes of the corresponding coding commutators.

The conducting segments of the commutators are in turn connected to the solenoids 42 of the secondary or translating typewriter.

Assume that the key for the numeral 2 is depressed, and assuming the numeral scrambler to be in the position indicated in Fig. 20, a circuit is established as follows: from grounded battery 120, now closed contact 40 for the numeral key 2, conductor 121, brush 99, segment 100 (the corresponding slip ring 101 and brush 102 described hereinbefore, but not shown in this figure), conductor 122, normally closed contact 123 of relay 124, conductor 125, solenoid 42 corresponding to the period key bar at the secondary unit, to ground.

Suppose that the period key bar of the primary typing unit is depressed, instead of the numeral 2 key bar. The following circuit is established: grounded battery 120, now closed contact 40 corresponding to the period character, conductor 126, brush 99, segment 100, conductor 127, normally closed contact 128 of relay 124, conductor 129 to solenoid 42 corresponding to the numeral 2 of the secondary typing unit, to ground.

Figure 20:
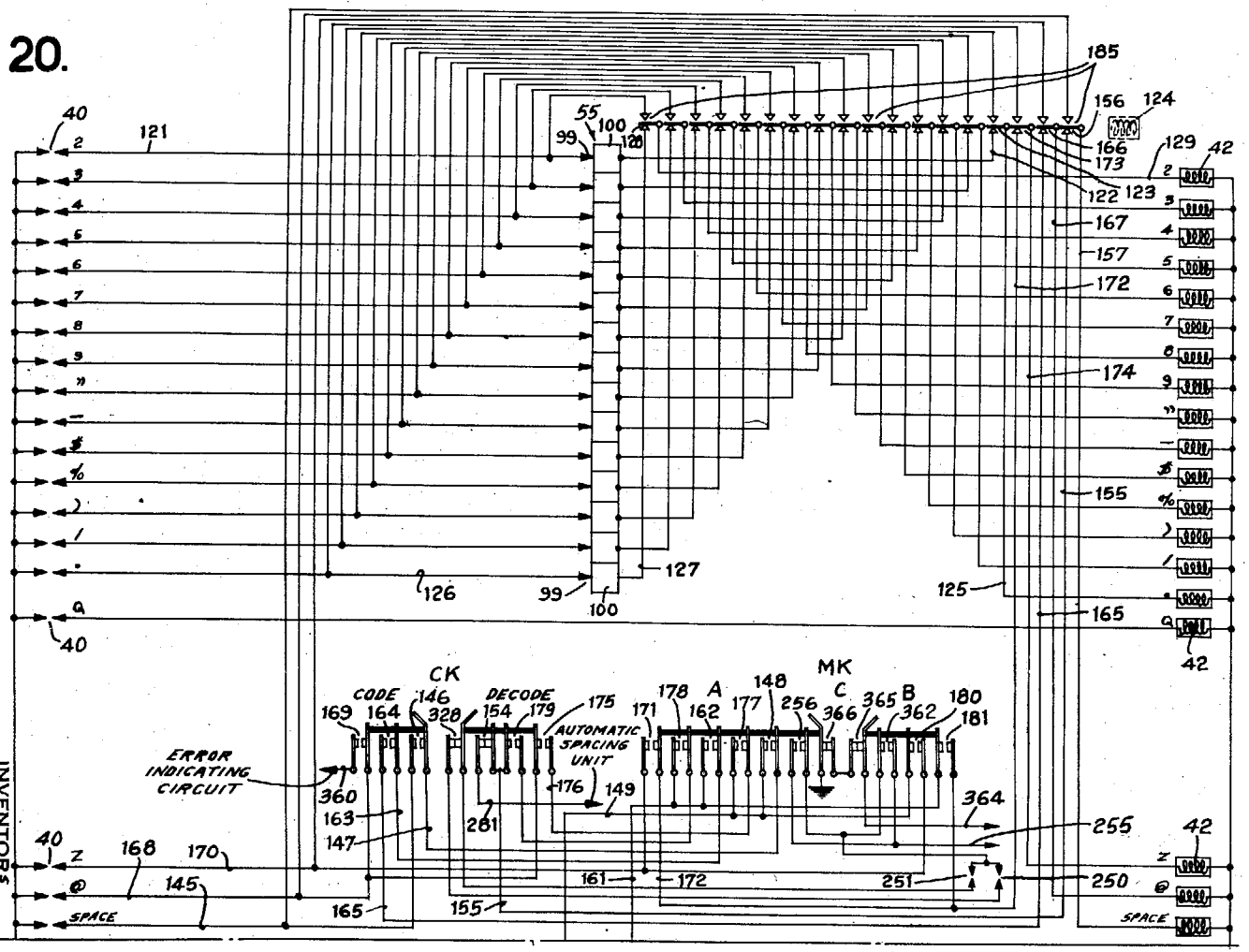
Figure 20A:
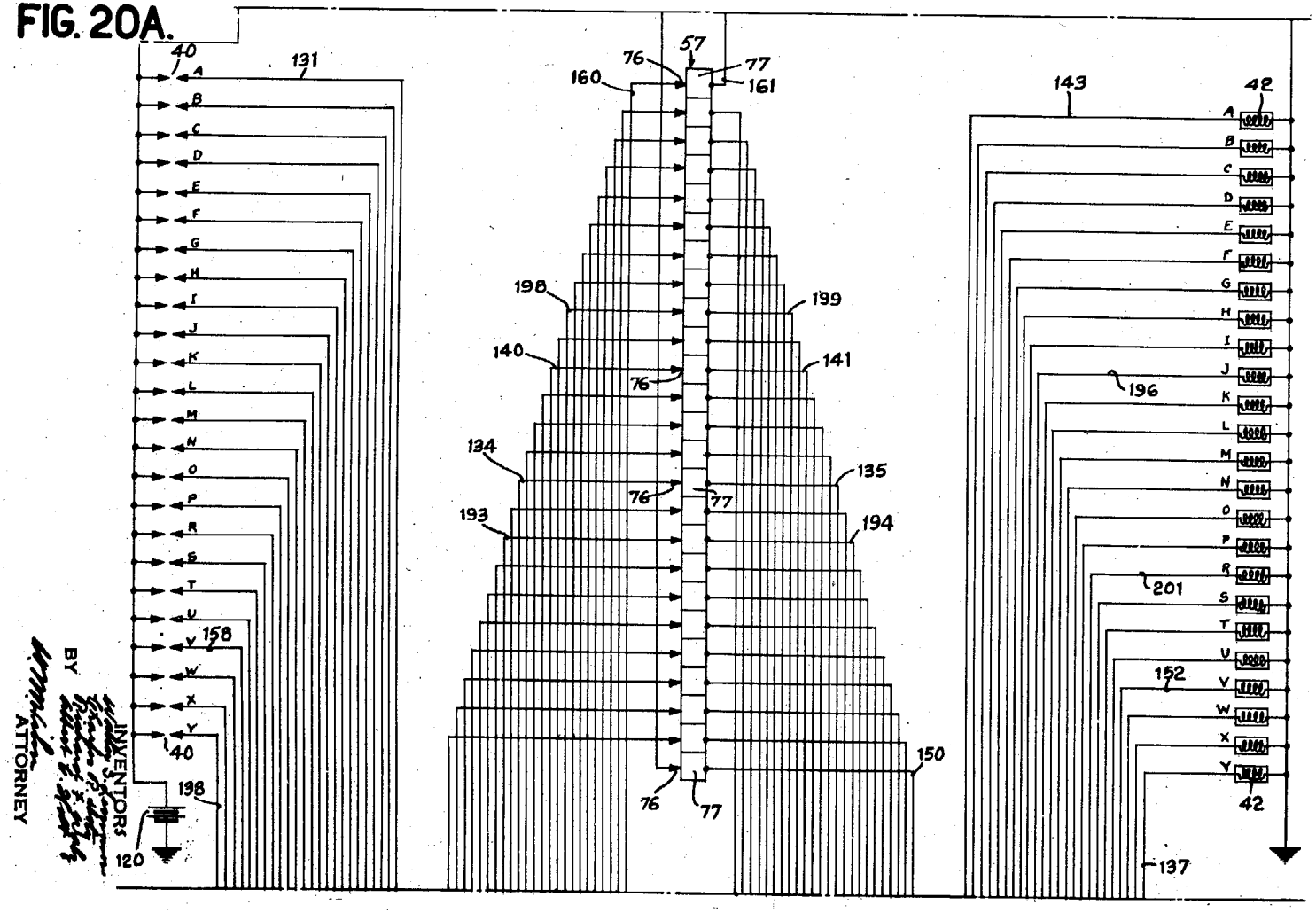
Figure 20B:
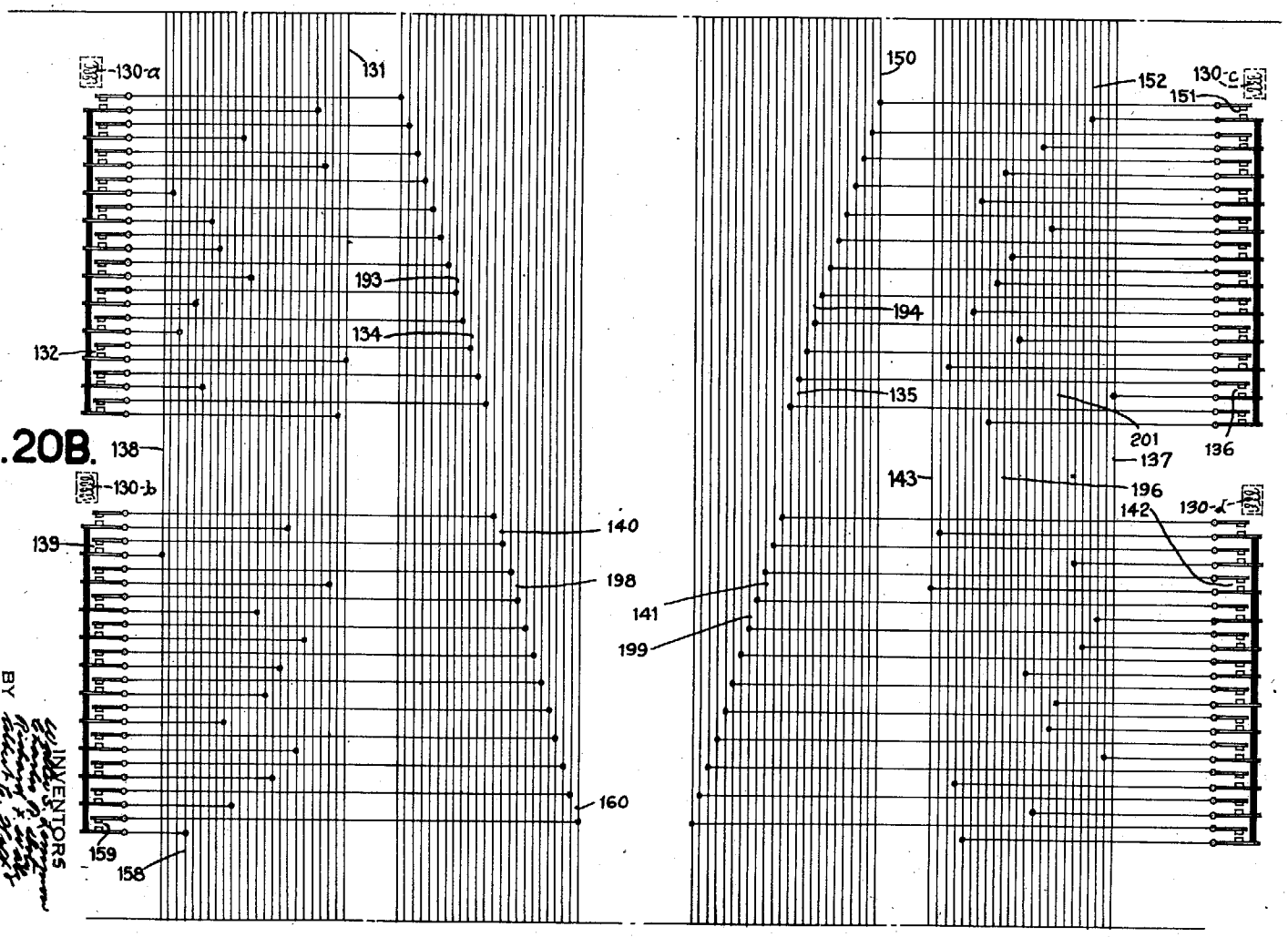
Figure 20C:
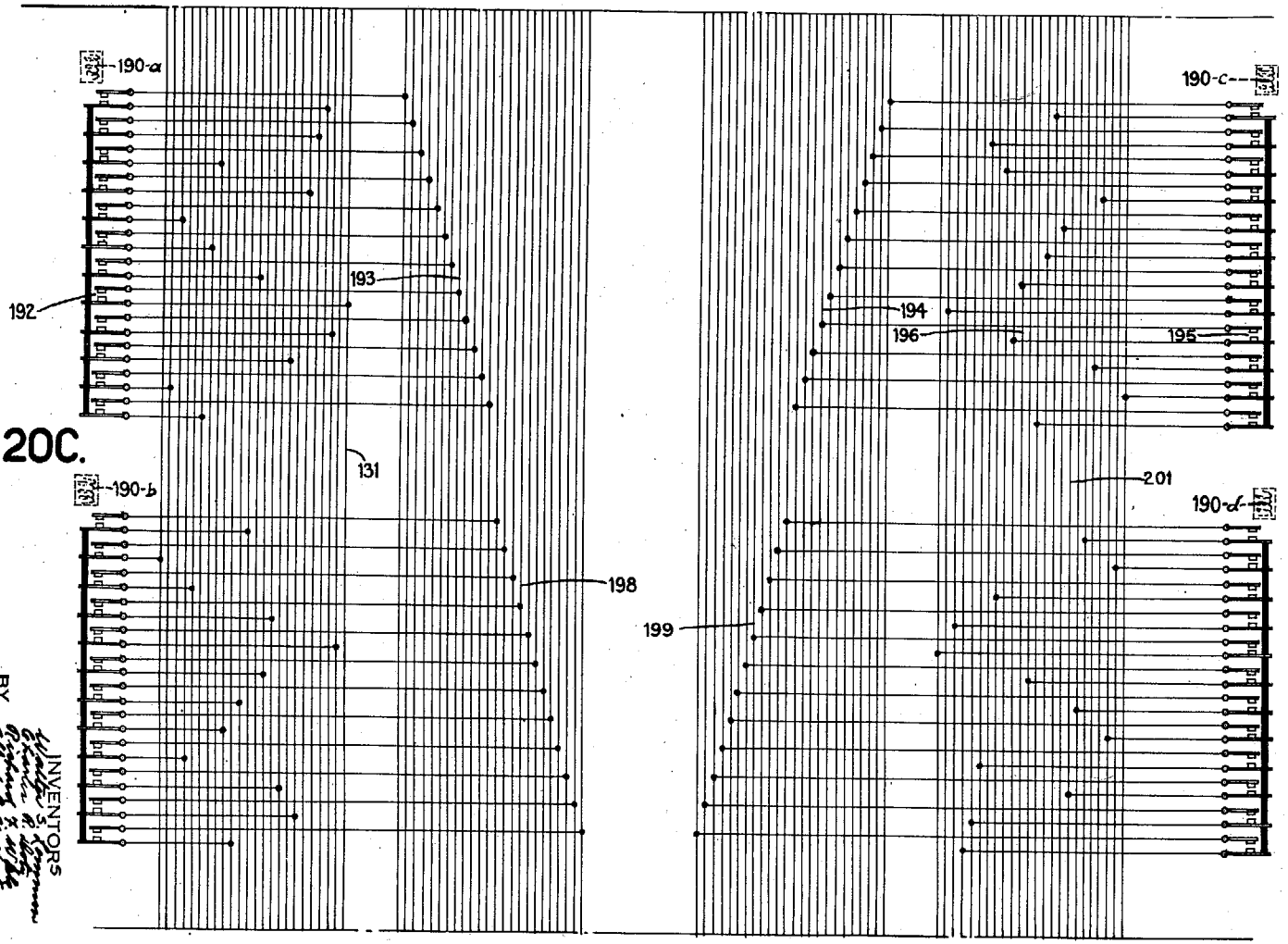
Figure 20D:
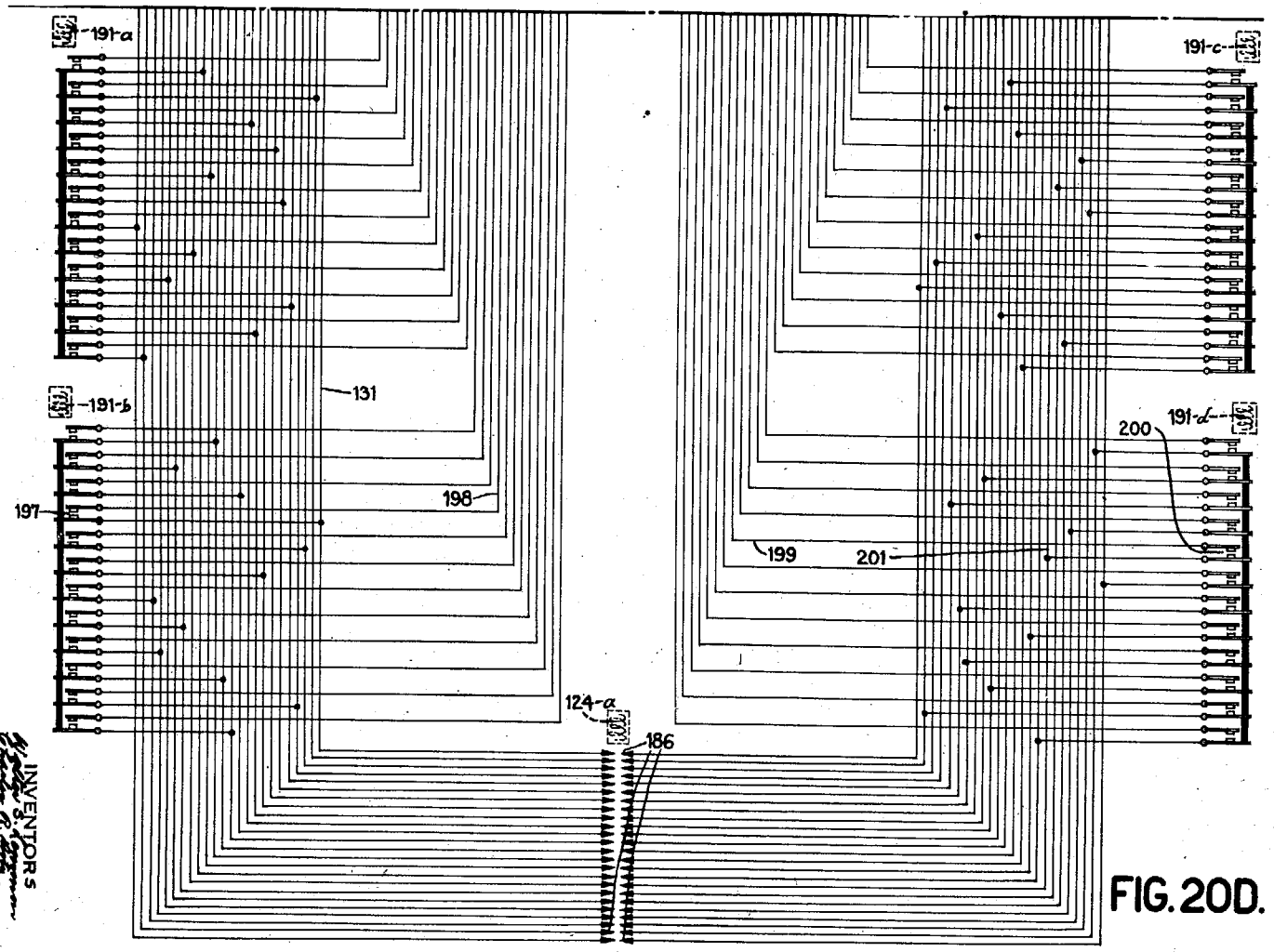

Again, let it be assumed that the alphabet scrambler is in the position shown in Fig. 20A and that the character sequence change relays 130*a*, *b*, *c*, and *d* (Fig. 20B) are energized to maintain the associated contacts in a closed position. Upon depression of the character A key bar, the corresponding contact 40 is closed connecting grounded battery 120 to conductor 131, contacts 132 of relay 130*a* now closed, conductor 134, brush 76, segment 77 (and corresponding slip ring 78 and brush 79 not shown in this figure but described hereinbefore), conductor 135, contacts 136 of relay 130*c* now closed, conductor 137 to solenoid 42 associated with the character Y key bar at the secondary unit to ground.

Suppose that the character Y key bar at the primary unit is depressed, instead of character A, the corresponding cam operated contact 40 connects grounded battery 120 to the following circuits: conductor 138, contacts 139 of relay 130*b*, now closed, conductor 140, brush 76, segment 77 (corresponding slip ring 78 and brush 79), conductor 141, contacts 142 of relay 130*d* now closed, conductor 143, solenoid 42 associated with the character A key bar of the secondary unit, to ground. Thus, reciprocity is established between the cam operated contacts of the key bars of the primary unit and the key bar solenoids of the secondary unit, so that if, for example, 2=. or A=Y in coding, .=2 or Y=A in decoding. The same reciprocal relationship is shown to be established throughout for most of the characters and signs of the alphabet chosen and further description thereof is deemed not necessary.

If the coding commutators were stationary, the relationship between the key depressed at the operating unit and the key bar actuated at the translating unit, that is, the equivalence between plain text and coded text, would be fixed for each wiring of the coding commutator. Not only is the coding commutator for each group of characters or signs rotatable and hence subject this relationship to variation, but the sequence of connections to the coding commutator segments may be varied in an arbitrary manner whenever desired.

Certain of the key character designations of the system have been treated and arranged in a different manner as compared with the remaining character and sign designations. For example, the character Q has been shown to be directly connected from cam operated contacts 40 of the operating unit to the actuating instrumentality; namely, the solenoid 42 corresponding to the character Q of the translating units.

The characters Z, @ and space have also been connected in a different manner, the reason for which is to be explained presently.

The specific circuit connections for the specially connected characters will be traced at this time, for it is believed it will be less confusing to obtain a complete understanding of the invention if the purpose and description of these connections is explained before the detailed operating and control circuits of the system are set forth.

It is noted that two control keys or switches CK and MK are provided. The CK key will be referred to as the code and decode key and as shown in the figures has two operating positions one for the coding operation and another position for decoding operation. The MK key is provided with three operating positions as shown, A, B, and C positions. The purpose of the MK key is a specific one for particular applications in a definite system, one example will be set forth immediately. However, it is not intended to be limited to the specific illustration. In using a system embodying the English language it may be desirable to provide for particular types of communications. For the purpose of coding regular communications such as contracts, letters, instructions, etc., the entire plain text copy including all characters, signs and spaces thereof may be coded into an unintelligible sequence of characters in the coded text to render the cipher more complex. In addition thereto, the coded text may be arranged in automatically arranged groups of letters, let us say, in five letter groups. It is understood therefore that it is necessary to interpose a space character automatically in the coded text irrespective of the word grouping of the plain text to be coded.

With the MK key in position A, that is so that the contacts in position A are operated, the illustration cited may be effected. It is obvious in order to operate the system in accordance with the example just set forth, an additional character or sign must be included to be effective and inserted in the coded text, due to utilizing the space character in coding at the secondary unit for the automatic spacing feature. For this purpose, the character sign @ is used.

Let it be assumed that the CK key is set to operate the contacts designated for code operation, the MK key set to operate the contacts designated in position A, the alphabet scrambler 57 in the position shown in the figures of the drawings, and the character sequence relays 130*a, b, c,* and *d* are in an operated position. Upon depression of the space bar the corresponding cam operated contacts 40 are closed to connect the grounded battery 120 to conductor 145, contacts 146 now closed, conductor 147, contacts 148 now closed, conductor 149 to the connected brush 76 of the alphabet scrambler segment 77, conductor 150, contacts 151 of relay 130*c* now closed, conductor 152 to the solenoid 42 connected to the character V key bar, to ground.

With the keys set in the positions stated, the automatic spacing unit (to be described later) connects grounded battery to conductor 281, contacts 154, now closed, conductor 155, contacts 156 of relay 124, conductor 157 and grounded space solenoid, automatically interposing a space in the coded text.

It is seen also that the depression of the character V key bar at the operating unit closes the associated contacts 40 connecting grounded battery 120 to conductor 158, contacts 159 of relay 130*b*, conductor 160, brush 76 and segment 77 of alphabet scrambler to conductor 161, contacts 162 of MK key, conductor 163, contacts 164 of CK key, conductor 165, contacts 166 of relay 124, conductor 167 to grounded solenoid connected to the character @ key bar of the translating unit.

The @ character has been chosen in this illustration as a substitute character whenever the space character at the operating unit is coded in the cipher text. It is obvious that the @ character is not intended to be used or to occur in the clear text to be coded, in other words, the @ key bar may be rendered inoperative at the operating unit during such typing operations. However, it is preferred to operate an error indicating circuit in case the @ key bar is depressed by mistake. The associated cam operated contacts 40 therefore connect grounded battery 120 to conductor 168, contacts 169 of CK key to an error indicating circuit which will be explained hereinafter. The character Z contacts 40 of the operating unit when closed connect the grounded battery 120 to conductor 170, contacts 171 of MK key, conductor 172, contacts 173 of relay 124, conductor 174 to the grounded Z solenoid at the translating unit.

Now assuming that the MK key, alphabet scrambler and relays 130*a, b, c,* and *d* remain in the same position as mentioned but that the CK key is positioned for a decoding operation. The character Z key bar circuits are not altered by positioning of the CK key and remain directly connected to the character Z solenoid 42 as described. However, upon depression of the character @ the associated contacts 40 connect grounded battery 120 to conductor 168, contacts 175 of CK key, conductor 176, contacts 177 of MK key, conductor 149 to alphabet scrambler to conductor 150, contacts 151 of relay 130*c*, conductor 152 to the grounded solenoid for character V at the translating unit.

The character @ solenoid of the translating unit is rendered inoperative due to the opening of contacts 164 of the CK key.

The space bar contacts 40 at the operating unit are rendered ineffective due to the opening of contacts 146 of the CK key. The automatic spacing unit is also rendered inoperative during the decoding operation due to the opening of contacts 154 of the CK key.

Upon depression of the character V key bar at the operating unit, the contacts 40 now connect grounded battery 120 to conductor 158, contacts 159 of relay 130b, conductor 160, brushes and segment of alphabet scrambler to conductor 161, contacts 178 of MK key, contacts 179 of CK key, conductor 155, contacts 156 of relay 124, conductor 157 to the grounded space solenoid of the translating unit.

To continue with the chosen illustration the following description will explain the coding and decoding operations for special types of communications, in which the space character is not introduced in the typing operation and hence no provision is necessary for assigning some other character therefor. This provision may be convenient in formulating coded texts for telegraph transmission purposes, etc. However, the automatic group spacing feature may be desired to be included for this type of coded copy or text. The MK key is then set so that the contacts designated in the B position are operated and for coding purposes the CK key, as before, is set in coding position.

The space character cam operated contacts 40 of the operating unit are rendered inoperative due to the opening of contacts 148 of the MK key.

The character @ cam operated contacts operate only the error indicating circuit. The character @ solenoid 42 is disconnected due to opening of contacts 162 of the MK key. The space character solenoid at the translating unit is connected by contact 154 of the CK key to the automatic group spacing unit as described hereinbefore.

The contacts 40 of character Z when closed connect grounded battery 120 to conductor 170, contacts 180 of the MK key, conductor 149 to the alphabet scrambler to conductor 150, contacts 151 of relay 130c, conductor 152 to the grounded character V solenoid at the translating unit.

The character Z solenoid 42 in this instance is operated upon the depression of the character V key bar at the operating unit. This operation is effected by the closing of contacts 181 of the MK key, transferring the described circuit to conductor 161 to the said contacts 181.

Setting the CK key for decoding operation, the circuits to the space character cam contacts, the character @ cam contacts are disconnected. The space solenoid 42 at the translating unit is disconnected due to the opening of contacts 154 of the CK key and the character @ solenoid remains disconnected. The reciprocity established between the key bar contacts of the operating unit and the key bar solenoids of the translating unit by operation of the MK key just described is not disturbed by operation of the CK key from code to decode position.

A third operating position is provided for the MK key; namely, the C position, the contacts of which are operated as shown in Fig. 20 of the drawings. With the MK key in this position, circuits to be described later are conditioned whereby the scrambling or coding mechanisms are disconnected due to operation of the relays 124 (Fig. 20) and 124a (Fig. 20D), so that should it be desired to insert a message in clear text in the coded message, positioning MK key accordingly permits the operating and translating typewriters to be operated to print in clear text on both machines simultaneously.

Let it be assumed that relays 124 and 124a are operated to close the normally open contacts 185 and 186 respectively, it is seen, for example, in Fig. 20 that the contacts 40 operated by the key bars at the operating unit are connected directly to the corresponding solenoids 42 at the translating unit due to the closure of contacts 185 of relay 124. In this manner, the numeral scrambler is disconnected from the typing or coding circuits and the clear text is recorded on both the said units whenever the MK key is set in its central position C.

Similarly the closed contacts 186 of relay 124a connect the contacts 40 operated by the key bars at the operating unit, directly to the corresponding solenoids 42 at the translating unit. The alphabet scrambler during such operations is disconnected from the typing or coding circuits, and rendered ineffective thereby.

It was mentioned hereinbefore that the relationship of the connections between the primary and secondary units are varied by irregular and arbitrary positioning of the coding commutators or scrambler units. This method of coding and decoding is effective to change the relationship of the characters of the units. In addition thereto, the arrangement of the circuit connections to the coding commutators may be altered so as to change the order of arrangement of the circuits thereof; that is, in addition to changing the relationship of the characters by positioning the coding means, the order of appearance or sequence arrangement of the characters is changed arbitrarily. This additional method of adding to the complexity of the resultant cipher text is believed to be an entirely new feature. In substance it amounts to automatically changing or substituting the character arrangement of the coding commutators. Heretofore this could only be accomplished by physically changing the connections to the coding wheels or substituting one coding wheel for another, which are connected in a different manner. To this end, the character sequence control relays 130a, *b*, *c*, *d*, 190a to *d* and 191a to *d* are provided. The contacts of the said relays are connected in an arbitrary manner to the cam operated contacts 40 of the operating unit and the brushes of the coding commutators and also from the said commutators to the solenoids of the translating unit.

It is to be noted by referring to Figs. 20, 20A to D, that the connections of the relay contacts between the coding commutator and the solenoids of the translating unit and the cam operated contacts of the operating unit and commutator are such as to maintain the said feature of reciprocity between the said units.

To illustrate the feature of changing the sequence of the characters, specific circuits will be traced when different character sequence control relays are operated.

Assume that the relays 130a to *d* are energized to operate the associated contacts and that the key bar for character A is depressed to operate the associated contacts 40. Grounded battery 120 is connected to conductor 131, contacts 132 of relay 130a, conductor 134, corresponding brushes and segments of the alphabet scrambler, conductor 135, contacts 136 of relay 130c, conductor 137 to character Y solenoid of the translating unit. It has been shown that if the key bar for character Y at the operating unit is depressed with the same relays operated and the alphabet scrambler set in the same position as shown in the figures, the character A solenoid of the translating unit is operated. It also has been shown that the reciprocal arrangement of connection of the characters is maintained throughout, therefore, it is obvious that the typing of the coded text on the operating unit is effective to type the message in clear text at the translating unit if the original settings of the coding control units are established.

Assuming now that the relays 190*a* to *d* are operated with the alphabet scrambler in the position as shown, depression of key bar for the character A connects grounded battery 120 to conductor 131, contacts 192 of relay 190*a*, conductor 193, alphabet scrambler 57, conductor 194, contacts 195 of relay 190*c*, conductor 196 to solenoid 42 for character J at the translating unit. Depression of character J key bar at the operating unit is effective to operate the character A solenoid at the translating unit due to the reciprocal arrangement of the character connections.

Again, assume that the relays 191*a* to *d* are operated with the alphabet scrambler in the position shown, depression of character A key bar, connects grounded battery 120 to conductor 131, contact 197 of relay 191*b*, conductor 198, alphabet scrambler 57, conductor 199, contacts 200 of relay 191*d*, conductor 201 to solenoid 42 for character R of the translating unit. Depression of character R key bar at the operating unit is effective to operate the character A solenoid at the translating unit due to the reciprocal arrangement of the character connections.

It has been shown how the character sequence arrangement is effected and that the order of appearance of the characters on the coding commutators is changed automatically upon energization and operation of one of the character sequence control relays. The control circuits for the said sequence relays will be explained later.

A brief descriptive outline of certain additional novel features provided in this system of coding and decoding will be given before the detailed circuit arrangement of the system is set forth. It is desirable to have an indication while operating the system that the various coding controlling elements and units are operated in accordance with the character key bar operation of the operating unit and the associated control circuits. To this end various checking and test circuit arrangements with corresponding lamp indicators are provided and are as follows:

During the typing operation, that is, upon depression of any character keys of the primary or operating unit, and immediately upon movement of the carriage of said unit coincident with the typing of the first character provision is made to lock the carriage return key bar of the unit at this moment and remains in this locked position until the end of the typed line is reached whereupon the said key bar is then automatically released. The length of each typed line can be arranged to consist of a certain number of characters, for example, let it be assumed that each line of typed copy at the operating unit comprises forty-five characters during the coding operation; therefore, at the translating unit where the characters are automatically grouped in groups of five characters, a line of copy comprises fifty-three characters including the eight spaces and forty-five representative characters. Upon the typing of the first character of the line at the operating unit the solenoid to a special key bar, such as the key bar 28*b* (Fig. 16) is energized causing the ball lock arrangement of the section 44*a* to be operated and thus prevent the depression of the carriage return key bar until the said special key bar is released. This occurs at the end of the typing of forty-five characters.

Also after typing the forty-five characters, provision is made to lock up the entire keyboard of the operating unit with the exception of the said carriage return key. This is effected by the operation of another special key bar 28*c* to operate the ball lock arrangement associated with said keyboard. The key bar 28*c* is released upon the carriage return operation of the translating unit. If decoding, this operation will take place after the typing of the fifty-three characters which make up the line.

Upon the completion of typing a predetermined number or group of lines, let us assume that eight lines comprise a group, provision is made to lock the entire keyboard including the carriage return key bar. In addition to locking the keyboard a signal lamp is energized to indicate to the operator that a checking operation is necessary. If all the operations were performed by the operating and translating units and the coding control units have not failed to operate in accordance with the circuit arrangement, operation of a test key will release the keyboard and carriage return locks, cause an indication to be recorded, such as a period character to be typed at the end of each group of copy; that is, at the end of the group of lines in the clear text and cipher text, and automatically cause the carriage of both units to be returned to the left margin for further operation. The energized test lamp is also extinguished. The typing of the period indicates to the operator that the system operated correctly during the typing operation of the said group of lines. It is to be noted that the carriages of the units are returned automatically upon group testing or checking whereas at the end of each line when the carriage return lock is released, the carriages are returned by a manual operation, that is, the carriage return key bar must be depressed.

If, however, the operation of the system was such that for some reason the certain control units failed to respond upon the actuation of the typing units, it will be found that if such an error occurred during the typing of any line of the first seven of each group, at the end of said line the entire keyboard including the carriage return key bar would be locked and rendered inoperative. This prevents the return of the unit carriages and is an indication that an error occurred during the said line, and that a correction operation is necessary. It will then be necessary to operate an error key the purpose of which is to return the coding control units to the position occupied thereby at the end of the previous group test period. It is necessary to retype the group of lines in which the error occurred. Upon operation of the error key, not only are the coding control units returned to the last group test position, but the entire keyboard of the operating unit is released, a symbol typed, such as a fraction bar at the end of the line in which the error occurred, to indicate on both copies of the text that an error occurred in the said line, and the carriages of the units automatically are returned to the normal or left margin position, in preparation for further typing operation.

If an error in operation occurs during the last line of the group of lines the test key operation will not be effective to return the carriages to normal position, type a period and extinguish the signal lamp. This is an indication that an error occurred in said line and that the error key must be operated to reset the coding units to the position occupied at the end of the last group test, and release the entire keyboard including the carriage return key bar, type a fraction bar symbol, indicative of the error, at the end of the group of lines, automatically return the carriages of both units to normal position and extinguish the signal lamp.

The units are now positioned and indicate that a further typing operation may be made, and, of course, due to the error in the said group, the group of lines must be retyped.

It should be mentioned at this point that when no error is made in typing the said group of lines and the usual indication is given upon operation of the test key, not only are the carriages of the units returned automatically to normal, etc., but control circuits are conditioned to operate certain coding control units such as a rotary switch, for example, which is effective to control different coding control circuits in accordance with the position thereof. The said rotary switch is operated to be moved forward one step each time the test key is operated provided no error in operation of the control units occurred. If an error occurred during the typing operation, the operation of the test key is ineffective as mentioned hereinbefore, and it then is necessary to operate the error key to reset the coding units to the position in which they were set at the end of the last group check or test. In this manner when an error occurs, the rotary switch unit is not given a false operation and the entire coding system is relined to correspond to the exact setting the individual coding units were positioned at the end of the previous group test.

It is obvious from the description thus far that provision must be made to automatically reset the coding control units of the system to a normal starting reference position or home position.

It is well known that in order to decode the cipher text by systems of this type the coding units must occupy the same position in decoding as occupied during coding and that the irregular and arbitrary setting of the coding units must correspond during decoding to the setting of the coding units during the coding operation. When the normal reference or home position is mentioned, it must be understood that this reference position may be changed arbitrarily at any time as may be desired. Therefore, the normal reference position referred to is the position chosen or selected to be designated for a certain number of operations as the home position.

A reset key is provided to position the coding control units when operated to return the said control units to the normal reference setting of the units. This setting will always remain the same, that is, upon operation of the reset key the units will always be returned to the same said home position selected, until it is desired to select a different common reference position.

To change the said reference position at will, a standard telephone dial is provided upon operation of which, control means are conditioned which will be effective to alter said reference point. Merely operating the dial is not sufficient to establish a different reference position. The said reset key must be operated to align the various control units to the newly selected position. Signal indicators such as lamps are provided to be energized when the equipment has been positioned to the designated positions. Provision is also made to return the units position due to the operation of the said dial to a normal common reference point, a key or switch which will be termed a homing key to differentiate from the reset key is adapted upon actuation thereof to effect the said operation.

The features referred to in this general description will be understood as the detailed description progresses and which will now be set forth.

*Resetting with code units in home position*

It is preferred in this system to require a reset operation before the normal operation of coding or decoding may be initiated, whether or not the coding control units are in the home position. In this manner, correct alignment of the coding control units will always be effected and insured before attempting to type the text or message on the operating unit of the system. A signal unit is provided to be operated which will serve as a positive indicator to the operator when the correct alignment of the units is completed.

Referring now to Figs. 17, 17A and 17B, arranged as shown in Fig. 18, and assume that the system is conditioned as follows: The MK key is set to operate the contacts shown in position A, the CK key is set in the coding position, and the power control circuits are closed by operating the switches 210 and 211 to energize the following circuits.

Grounded battery 212 is connected to conductor 213, a collecting ring brush 214A, collecting ring 215A, conducting segments 86, and brushes 82, ring 215B, brush 214B (see Figs. 1, 6 and 7), coil of relay 216 to ground, energizing said relay, opening the normally closed contact 217 and closing the contact 218. Although relay 216 is rendered operative, no circuits are energized until a subsequent operation of the control devices.

Operation of the reset key RK applies a ground through the associated contact 219 to coil of relay 220 to cause the said relay to be energized by means of the following circuit: grounded battery 212, common conductor 221, normally closed contact 222 of relay 223, conductor 224, coil of relay 220, contact 219, to ground. The associated contacts of relay 220 are now operated, contact 225 controls the power circuit to the sequence control relays 130*a* to *d*, 190*a* to *d* and 191*a* to *d* and are opened to disconnect the battery 212 from the said relays. Contact 226 connects ground to the coil of relay 227. However, it is to be noted that the other side of the coil of relay 227 is connected to ground through contact 219 of the reset key RK. Therefore, so long as the reset key is depressed, the grounded battery 212 is shunted from the coil of relay 227, rendering said relay inoperative until the RK key is released, whereupon the grounded battery 212 is then connected to conductor 221, contact 222 of relay 223, coil of relay 220, conductor 228, coil of relay 227, conductor 229, contact 226, to ground, energizing said relay 227 and thereby causing the associated contact 230 to open and contact 231 to be closed.

From the description thus far, during the reset cycle, relays 220 and 227 are now energized and if the coding control units are in the normal home position, relay 216 also is energized. Grounded battery 212 is connected to contact 218 of relay 216, conductor 232, contact 164a (now closed due to position of disc 164 of numeral scrambler, see Fig. 4), conductor 233, contact 71 of the program device (now closed due to program device being in home position and position of gear 60, see Figs. 2 and 9), conductor 234, contact 235 of relay 220, conductor 335a, wiper or brush 236 associated with the third bank of contacts of rotary switch 237, contact 238 (the wipers or brushes 236, 239 and 240 as shown in Fig. 17B are indicative of the home position thereof), conductor 241, coil of relay 223, to ground, energizing said relay and causing the associated contacts to be operated, contacts 222 and 242 are opened and contact 243 is closed to establish the following holding circuit for relay 223.

The circuit was just described showing how grounded battery 212 is connected to conductor 234, from said conductor the battery is connected to normally closed contact 244 of relay 245, conductor 246, contact 243, coil of relay 223 to ground.

Contact 242 of relay 223 now open is a control switch and included in the holding circuits for other relays which will be described later.

Contact 222 of said relay causes the relays 220 and 227 to be deenergized, due to opening the power supply to said relays which was just described. The signal lamp 247 is also maintained energized through the conductor 248 which is connected to the one side of the coil of relay 223. Energization of the said signal lamp is now an indication that the control units are all set in the normal home position and that the system is ready for the initial operation for coding (or decoding if the coding key CK is set in the decoding position). It is well to state here that the program device 53 is stepped ahead upon the depression of any character key (in the coding operation this also includes the space key bar), and the operation of the program device causes the contacts 71 associated therewith to be opened, in turn opening the holding circuit for relay 223 just described, and, of course, it is obvious that upon the deenergization of the said relay the signal lamp 247 is extinguished.

Common impulse contacts 250 are provided for the purpose of stepping the program device and other control units ahead and are closed upon the depression of each character key bar of the operating unit with the exception of the space key bar. Specific mechanism for this provision is not shown since it is old and well known in the art; one method, which has been used heretofore, is to provide a common bar beneath the key bars of the typewriter and arranged so that the depression of the character keys lowers the common bar which in turn causes the said common contacts to be closed. The cam (Fig. 14) operated by the spacer bar is adapted to actuate a double type of contact arrangement and described hereinbefore, one set of contacts corresponding to the contacts 40 for the space bar as shown in Fig. 20 and the other set of contacts corresponding to the contacts 251 shown in Fig. 17A.

*Operation of coding control units*

Upon depression of a character key at the primary or operating unit, the said common contacts 250 are closed to establish the circuit as follows to step ahead the program device, grounded battery 212 is connected thereto through conductors 221, contact 230 of relay 227, conductor 252, normally closed contact 253 of relay 254, conductor 255, contacts 256 of MK key, common contacts 250, conductor 257 to the grounded operating coil 258 of the clutch unit 51 (Fig. 1) of the program device 53. It was explained hereinbefore that the program device is not stepped ahead upon the energization of the clutch operating coil but upon the deenergization thereof, that is, upon the decay of the impulse. This is true of all the coding control units such as the alphabet and numeral scrambler units, rotary switch etc. and thus prevents any faulty operation of the equipment.

Therefore, upon the opening of the common contacts 250, or upon the decay of the impulse initiated, the program device is stepped ahead one step which as stated before is equivalent to a movement of one degree. Referring now to the program disc pin or plug layout as shown in Fig. 21, it is noted that upon the first movement or step of the discs none of the associated contacts 65 are closed. However, it is remembered that the advancement of the gear wheel 60 causes the associated contacts 69 and 70 to be closed and the contacts 71 to be opened breaking the holding circuit established therethrough for relay 223 deenergizing said relay.

It is understood upon the depression of the said character key of the operating unit in addition to closing the common contacts 250, the associated cam operated contacts 40 (Figs. 20, 20A to D) are closed to establish a typing circuit through the associated scrambler unit operating a selected key bar at the translating unit. The character is recorded in clear text at the operating unit and in coded text at the translating unit.

In the Figures 20, 20A to D, it is seen that the relay 124, when not energized, has associated therewith a plurality of normally closed contacts for example, contacts 128, 156, and 173. The tying circuits for the selected group of characters associated with the numeral scrambler 55 are established through the said normally closed contacts. However, the typing circuits associated with the alphabet scrambler 57 are established through different controlling relays at certain intervals or periods during the operation of the system.

The purpose of the character sequence control relays 130a to d, 190a to d, and 191a to d has been set forth; it will now be shown how one of the said relay groups is energized to complete or establish the typing circuits. The numeral scrambler at this point in the cycle of operation is in the home position (Figs. 4 and 17) and therefore the associated cam operated contacts are operated as shown to establish the following circuit; grounded battery 212, to conductor 221, contact 225 of relay 220, conductor 282, contact 283 of relay 284, conductor 285, contact 108a operated by cam disc 108 of the numeral scrambler coils of relays 130a to d to ground, energizing said relays and causing the associated contacts to be closed, thereby establishing the typing circuits between the said operating and translating units. It will be seen that during the typing cycle at all times one of the said group of relays will be rendered operative due to one of the cam disc controlled contacts 106a, 107a, 108a, being operated.

It was also mentioned hereinbefore immediately upon movement of the carriages coincident with the typing of the first character, the carriage return key bar is rendered inoperative or locked at this moment and remains so until the end of the specified line containing a predetermined number of characters whereupon the carriage return key bar is released. Fig. 17A shows the position or relation of the carriage contact bars 34 and 34a with respect to the associated brushes 35a and 35—1a respectively, when the carriages of both units are in the left margin position. The contact bars move in accordance with the positioning of the associated carriages.

The operating and translating units have the same contact bar construction and the brushes cooperating therewith are connected in parallel to the control circuits which will now be described.

When the carriages are in the left margin position as shown or in the forty-fifth or fifty-third character positions (these positions are indicated by the insulated segments 35a and 35—1a, 35b and 35—1b, and 35c and 35—1c respectively) the carriage return key bars should be released so as to be able to be operated and during any other positions of the carriages the carriage return key bars should be locked.

Therefore, when the brushes 36 and 36a engage the conducting segment of bars 34 and 34a, grounded battery 212 is effective to energize and operate relay 260 as follows: grounded battery 212, conductor 221, contact 222 of relay 223, conductors 224 and 261 to said carriage brushes 36 and 36a, conductor 262, coil of relay 260, conductor 263, contact 264 of relay 265 to ground, energizing said relay and operating the associated contacts, opening contact 266 and closing contact 267.

The battery 212 impressed on conductor 261 is now effective to operate the carriage return key bar lock as follows: conductor 261, contacts 268 of the test key TK, conductor 269, contacts 270 of relay 271, conductor 272, contact 267 of relay 260, solenoid 42b, to ground, energizing said solenoid. The solenoid 42b is attached to the key bar 28b (Fig. 16) at the operating unit, depressing said bar to operate the ball lock in section 44a, thus locking the carriage return key bar 29a and maintaining the carriage return key bar inoperative until the insulating segments on the carriage contact has engaged the associated brushes to break the described circuit to relay 260.

It is to be noted that the opening of contact 266 of relay 260 opens a circuit to the test key TK, so that if the carriages are not coincident the test key circuits are rendered inoperative.

Upon the depression of a character key at the operating unit a second time, the clutch operating coil 258 of the program device is energized through the said circuits just described including the common operated contacts 250. The program device is stepped ahead upon the decay of the said impulse and contacts 65 associated with the discs 59—1, 59—2 and 59—9 are operated by the pins or plugs 62 associated with the said discs and arranged in accordance with the layout shown in Fig. 21.

The contacts 65 associated with the program device discs 59—1 to 9, 11 and 12, are connected to a common power source through a common conductor 275 joining the conductor 257. Closure of the common contacts 250 connects the power source to the said conductors 257 and 275 each time a character key of the operating unit is depressed during the coding or decoding cycle of operation.

The operated contacts 65 (associated with discs 59—1, 2, and 9) are connected to various contacts of the rotary switch or relay 237. The said switch is provided with three arcuate banks of contacts which are connected in an arbitrary manner to common conductors which are connected to the program device disc contacts 65. The said rotary switch is of the step-by-step type similar to those used in automatic telephone systems having a plurality of wipers or brushes (238, 239 and 240) adapted to be moved round in a continuously forward direction step by step over a bank of associated contacts by means of a ratchet mechanism.

The wipers of brushes move in a single plane and advance on the deenergization of the motor magnet 276. A switch of this type is shown in Fig. 48 on page 51 of the second edition of the book "Automatic Telephone" by Smith and Campbell. The brushes of the said switch are shown to be in the normal home position. In this position and with the closure of the said contacts 65, it follows that a closed circuit is formed from the contact 65 associated with disc 59—2 by conductor 277 to the first contact in bank one of the said switch. This circuit established is not energized until a subsequent operation of the character key bars.

Therefore upon the depression of a character key a third time the program device clutch operating coil is energized through the circuits described including conductor 257, and in addition thereto the power source is now connected to conductor 275, contact 65 associated with disc 59—2, conductor 277, contact of bank one of rotary switch, wiper or brush 240, conductor 278, to grounded operating coil 279 of the clutch 51b for the alphabet scrambler 57 (Fig. 1). The operation of the clutch unit 51a is understood and known to be actuated only upon deenergization of the said operating coil.

Upon the decay of the third operating impulse the alphabet scrambler unit 57 is stepped ahead one step to change the direct transposition or connections between the typewriter units. In addition thereto, the advancement of the alphabet scrambler causes the relay 216 to be deenergized in the following manner.

The insulated ring unit 84 provided with a conducting segment 86 (Fig. 7) is adapted to be stepped ahead one step which was described hereinbefore to open the circuit connected to brushes 82 engaging the segments 86 in the normal home position. This open circuit causes battery 212 to be disconnected from relay 216 and causing the associated contact 218 to be opened and contact 217 to be closed.

The conducting rings 85 provided with the insulated segments 87 corresponding to three steps of the alphabet scrambler unit are also advanced one step forward so that the circuits connected to the brushes 83 are now closed.

The program device is also stepped ahead in addition to the alphabet scrambler upon the decay of said impulse and due to the pin arrangement on the associated discs contacts 65 associated with discs 59—2 and 9 are opened and contact 65 associated with disc 59—1 remains closed.

Upon the depression of a character key at the operating unit a fourth time the clutch operating coil 258 of the program device is energized as described hereinbefore. The circuit established by virtue of the closure of contacts 65 operated by disc 59—1 remains deenergized due to the position of brush 240 of the rotary switch. Upon the decay of the fourth impulse, the program device is advanced one step forward to close the contacts 65 associated with disc 59—1, 2 and 3. So that upon the depression of a character key a fifth time, in addition to energizing the clutch operating coil 258 of the program device, a circuit established through contacts 65 operated by disc 59—2 is energized to operate the clutch operating coil 279 of the alphabet scrambler. This specific circuit has been traced before and need not be repeated.

The circuits established through contacts 65 operated by discs 59—1 and 2 are not energized due to the position of brush 240 of the rotary switch. It is obvious from the description thus far that the discs 59—1, 2 and 3 control the operation of the alphabet scrambler and due to the pin arrangement on the said discs and the position of the brush 240 of the rotary switch with respect to the associated contacts in bank one thereof, the operation of the alphabet scrambler occurs at irregular and arbitrary intervals. The operation of the alphabet scrambler is effective again to change or transpose the circuit connections of the predetermined group of characters between the primary and secondary typing units.

Upon the decay of the said fifth impulse the alphabet scrambler and program device are advanced a step forward. The contacts 65 associated with discs 59—1 and 10 are now closed. It was mentioned before that provision is made during the coding operation to automatically group the characters of the coded text and for the purposes of illustration, groups of five characters each are assumed. It will be seen that the disc 59—10 controls automatically the spacing solenoid of the translating unit upon the recording of every fifth character. Grounded battery 212 is impressed upon conductor 257 through circuits described before, to contact 328 and conductor 280, contacts 65 associated with disc 59—10, conductor 281, contacts 154 of CK key conductor 155, contacts 156 of relay 124 (see Fig. 20) to the grounded solenoid 42 connected to the space bar at the translating unit, thus introducing the space in the coded text automatically.

It should be mentioned at this time that it is well known during the operation of a typewriter of the Electromatic type that if a key bar is maintained depressed for a long interval only one impression of the character is made, therefore, it is immaterial if the space bar solenoid of the translating unit is energized for an interval until the program device is advanced another step forward to effect opening of contacts 65 associated with disc 59—10. Also, since all operations of typing are performed on the operating or primary unit, it is only necessary to provide that unit with a keyboard lock; therefore, a continuous depression of the space key bar at the translating unit will not prevent further operation or the depression of other character key bars thereat.

It is deemed not necessary to describe and trace all the individual circuits established during the typing cycle of the system and therefore the remaining description will be limited to the circuits established and which have not been described upon the depression of character keys at the operating unit at certain intervals during the said cycle.

With reference to Fig. 21, it is seen upon the decay of the thirteenth impulse, the program device is stepped ahead one step and contacts 65 associated with discs 59—2, 4 and 6 are closed. Therefore the fourteenth impulse (upon depression of the character keys the fourteenth time) initiated causes the clutch operating coil 279 of the alphabet scrambler to be energized due to the circuit established through contacts 65 operated by discs 59—2.

The said impulse impressed on common conductor 275 also is now impressed on the circuit established through contacts 65 associated with disc 59—4, conductor 286, corresponding contact of bank two of the rotary relay, brush 239, conductor 287, clutch operating coil 288 of the numeral scrambler to ground. Upon the decay of said impulse the numeral scrambler in addition to the program device and alphabet scrambler are stepped ahead one step. Advancing the cam discs 104 to 108 of the numeral scrambler causes the contacts 108a to be opened removing the grounded battery 212 from the sequence control relay group 130a to d, deenergizing said relays. Contacts 107a are now closed and connected to common conductor 285 to energize the relay group 190a to d to change the sequence of connections of the circuits to the coding commutator of the alphabet scrambler. Contacts 104a are opened and contacts 104b and 105a are closed due to the configurations of the said cam discs, the purpose of which will be described later herein.

It is seen that the contacts 65 operated by discs 59—4 to 9 are associated with the contacts of bank two of the rotary switch and control the irregular and arbitrary operation of the numeral scrambler 55.

Upon the decay of the twenty-third impulse, the program device is stepped ahead to close the contacts 65 of disc 59—4 so that the following impulse initiated energized the clutch operating coil 288 of the numeral scrambler. Upon advancement of the said scrambler one step whereby contact 107a is opened to deenergize the sequence control relay group 190a to d and contacts 106a are closed to energize the relay group 191a to d to again change the character sequence connections.

It was mentioned that for purposes of illustration the predetermined length of the line at the operating unit was limited to forty-five characters including the spaces of the clear text (it is noted that the space cam operated contacts 251 operate the connected circuits in exactly the same manner as the common contacts 250), and that at the end of each line the entire keyboard is rendered inoperative and the carriage return key bar which has been maintained inoperative during the typing of the line is now rendered operative. The following circuits to be described are those which are energized upon correct operation of the equipment. The circuits energized for incorrect operation will be described later herein.

Upon the decay of the forty-fourth impulse the program device is stepped ahead (in addition to the alphabet scrambler) to close the contacts 65 of disc 59—11, so that upon initiation of the forty-fifth impulse the grounded battery impressed on common conductor 275 is also impressed on the circuit established through contact 65 of disc 59—11, conductor 289, contact 290 of relay 291, coil of relay 292 to ground, energizing said relay and causes the associated contacts 293 and 294 to be closed. The said relay remains energized until the decay of said impulse whereupon a holding circuit is established for the relay in the following manner.

Due to the closure of contacts 294 of the said relay, the impulse impressed on conductor 289 is also impressed on the circuit connected to contact 294. This circuit is also connected to the source of power as follows: grounded battery 212, conductor 221, cam operated contact 295 (this normally closed contact is operated to be opened upon depression of the carriage return key bar at the secondary or translating unit, the contact arrangement operated by the cam associated with the key bar is similar to the ones described in connection with Fig. 14), contact 242 of relay 223, conductor 296, coil of relay 291, contact 294 of relay 292. Therefore, it is evident that until the contacts 250 are opened to disconnect the battery through the associated connected circuits to contact 294, the relay 291 remains deenergized, and also the holding circuit for relay 292 is not established until the said contacts are opened.

The following circuit is established through the now closed contact 293 of relay 292: grounded battery 212, conductor 221, contact 222 of relay 223, conductors 224 and 261, contacts 268 of TK key, conductor 269, contact 270 of relay 271, conductor 272, said contact 293 to the grounded solenoid 297, energizing said solenoid, which will be referred to as the keyboard lock solenoid. This solenoid is connected to the key bar 28c (Fig. 14) through the link 43, and upon its operation depresses the said key bar to lock the entire keyboard of the operating unit with the exception of the carriage return key bar 29a. So long as the solenoid 297 remains energized, a character key bar including the space key bar cannot be depressed.

When the contacts 250 are opened to deenergize the connected circuits, the holding circuit just described for relay 292 is established through the associated contact 294 to maintain the keyboard lock solenoid energized, and relay 291 is energized to cause its normally closed contact 290 to be opened.

It was mentioned that at the end of the line the carriage return key bar at the operating unit is released to permit manual operation thereof to return the carriages to the left margin positions. At the end of the line, in the case of correct operation of the units, the carriage of the operating unit is positioned in the forty-fifth character position; that is, the associated contact bar 34 is positioned so that the insulating segment 35b is engaged by one of the brushes 36, and the carriage of the translating unit is positioned in the fifty-third character position (forty-five characters and eight spaces) so that the insulating segment 35—1c of the associated contact bar 34a is engaged by one of the brushes 36a (in decoding the operating unit carriage would be in the fifty-third character position and the translating in the forty-fifth character position to engage the respective insulating segments 35c and 35—1b). In the said positions of the carriages the circuit connected to the brushes 36 and 36a is opened, thereby disconnecting the battery 212 from the relay 260, deenergizing said relay to cause contact 266 to be closed and contacts 267 to be opened. Opening of contact 267 disconnects the battery from the carriage return lock solenoid 42b and releasing the associated depressed key bar 28b to render the carriage return key bar 29a operative.

Upon depression of the carriage return key bar at the operating unit, it is well known in the typewriter of the Electromatic type, that the carriage is returned automatically due to the operation of its associated cam and bell crank member (Fig. 14). Contacts 300 (Fig. 17) are operated by the cam associated with the key bar mechanism at the operating unit and closing of said contacts causes the solenoid 301 connected to the carriage return key bar at the translating unit to be energized, grounded battery 212 to conductor 221, contacts 300 and the said solenoid 301 to ground. This is effective to return the carriage at the translating unit to the left margin. However, upon depression of the carriage return key bar at the translating unit the associated cam operates the normally closed contacts 295 associated therewith. Opening of the contacts 295 breaks the holding circuit to relays 291 and 292 established therethrough. Deenergization of the said relays causes the solenoid 297 to be deenergized which releases the key bar 28c to unlock the keyboard at the operating unit. The carriages of the operating and translating units are now in the left margin positions and both key locks are rendered inoperative releasing or unlocking the entire keyboard and the carriage return key bar. The equipment is conditioned now for another line of operation, during which period the various coding control units will be irregularly operated in accordance with the arbitrary control pin arrangement of the various control discs of the program device. At the end of each line and if the equipment operated correctly, the keyboard lock and carriage return control circuits are energized and operated just as described.

It was mentioned hereinbefore that other checking features were included, one of which consists of rendering the entire keyboard and carriage return key bar at the operating unit inoperative at the end of a group of lines, and to continue with the chosen example, the group to consist of eight lines (that is, 360 characters including spaces of the clear text) and providing a signal to indicate this condition which is an indication that a checking operation is necessary. A test key is operated, which if the equipment operated correctly will release the keyboard and carriage return locks, cause an indication to be recorded (which is a period to indicate correct operation) at the end of the group of lines of both the clear and cipher text and automatically cause the carriages to be returned to the left margin for further operation. The circuits for this checking operation at the end of a group of eight lines will now be described.

Upon the decay of the three hundred and fifty-ninth impulse the following control contacts of the program device are closed, contacts 65 operated by discs 59—1, 2, 3, 7, 11 and 12 (see Fig. 21), so that upon the initiation of the three hundred and sixtieth impulse due to the closure of contacts 250, the alphabet scrambler clutch operating coil 289 is energized through the circuit established by contact 65 of disc 59—2, and which will be stepped ahead upon the decay of said impulse.

Through the contacts 65 of disc 59—11 battery 212 impressed on conductor 275 is connected to conductor 289 to energize relay 292 closing the contact 293 to energize the keyboard lock solenoid 297, thus locking the keyboard at the operating unit.

The locking circuit to be established through contact 294 for relay 292 and the energization of relay 291 is delayed until the battery is disconnected through the contacts 250 so as to permit the battery through conductor 296 to dominate, further description of this current is thought not necessary due to the detailed description set forth hereinbefore.

Through the contact 65 of disc 59—12 the battery impressed on conductor 275 is connected to conductor 302, contact 303 of relay 254, coil of relay 304 to ground energizing the latter relay causing the associated contacts to be operated, contacts 305 and 306 are closed and contact 307 is opened. Through the contacts 305 the carriage return lock solenoid 42b at the operating unit is energized as follows: the battery impressed on conductor 261 is connected through contacts 268 of the test key TK, conductor 269, contact 270 of relay 271, conductor 272, said contact 305, conductor 308 to the grounded solenoid 42b. In this manner both the keyboard and carriage return locks are operated to render the complete keyboard of the operating unit in a locked and inoperative position. Through the contact 306 of relay 304 a signal indicator 309 to be referred to as the test lamp is energized indicating that the complete keyboard at the operating unit is locked and rendered inoperative and that a proving or check operation is necessary. The indicator circuit established is as follows: battery 212, conductor 221, normally closed cam operated contacts 295 (operated by carriage return key bar at translating unit), contact 242 of relay 223, conductor 296, said contact 306 and grounded test lamp 309.

Contact 307 opens a circuit to contacts 169 of the CK key which are connected to the cam operated contacts of the character @ key and the purpose thereof will be described later.

The contact 306 of relay 304 also is effective to establish a holding circuit for the relay 304, however, the holding circuit is not established until the contacts 250 are open to disconnect one source of battery from the coil of relay 304. It is noted that battery from contacts 250 is connected through contacts 65 of disc 59—12, conductor 302 to one side of the coil of relay 254 and also to coil of relay 304, the battery circuit just described dominates to energize relay 304 so long as the contacts 250 are closed. The battery connected to conductor 296, contact 306 of relay 304 to energize the test lamp is also impressed on conductor 310 to the other side of coil of relay 254, thus relay 254 remains deenergized until the decay of the impulse initiated through contacts 250. Upon the decay of said impulse it is seen how relay 254 is energized and relay 304 maintained energized.

Energization of relay 254 causes the following operations to be performed: Through contact 311 a circuit is established to energize relays 124 and 124a which relays (Figs. 20, 20A to D) when operated are effective to connect the cam operated switches or contacts 40 of the operating unit directly to the corresponding solenoids 42 of the translating unit so that an actuated key bar of the operating unit is effective to print or record in clear text the character on both units.

Grounded battery 212 is impressed on conductor 221, contact 225 of relay 220, conductor 282, coil of relay 284, conductor 312, contact 311 of relay 254, conductor 313 to ground, energizing relay 284 causing the associated contact 283 to be opened and contact 314 to be closed. Opening of contact 283 disconnects battery from conductor 285 and contacts 106a, 107a and 108a of discs 106 to 108 thereby deenergizing any one of the sequence control relays, 130a, b, c, d, 190a, b, c, d, and 191a, b, c, d. It noted on Figs. 20, 20A to D that the deenergization of said sequence control relays causes the alphabet scrambler unit to be disconnected from the typing units.

Through the contacts 314, battery from conductor 282 is connected to relays 124 and 124a energizing said relays. Energization of relay 124 disconnects the solenoids 42 of the predetermined group of characters from the numeral scrambler and transfers the connections of the said circuits by contacts 185 directly to the corresponding character cam operated contacts 40 of the operating unit. Energization of relay 124a causes the contacts 186 to be closed to connect the cam operated contacts 40 of the second group of characters directly to the corresponding solenoids of the translating unit. It is seen now that the actuation of a key bar at the operating unit would cause the character to be printed in clear on both of said units, if the keyboard could be operated.

Operation of contact 303 of relay 254 opens the circuit to contacts 65 of discs 59—12 thereby preventing any back circuits to be formed to relays 304 and 254.

Operation of the contact 253 opens the circuit from battery 212 to the coding unit impulse contacts 250 so that upon operation of the character key bars for insertion of clear text, for example, faulty operation of the coding units is not effected. Closing of contact 315 establishes a partial circuit to the test key TK the purpose of which will be explained presently.

The test key TK must be operated to determine whether or not the coding units functioned properly. For purposes of description thus far this condition is assumed and therefore upon operation of the TK key a character or indication is to be recorded on both the operating and translating units at the end of the last line of the group, for example, the period character is chosen and it will be shown how this character is recorded to indicate that the system during the coding or decoding of the said group of lines recorded operated correctly. The carriages of both units will be returned automatically to the left margin, the test lamp extinguished and the rotary switch will be advanced a step to condition the system for further operation thereof.

It should be mentioned here that the numeral scrambler, alphabet scrambler and program device are in position in the normal home position as shown in the figures if no error was made during the operation of typing the group of lines. This is due to the predetermined number of steps in the cycles of the individual units; namely, three hundred and sixty steps to complete one revolution of the program device, fifteen steps to complete one revolution of the numeral scrambler and twenty-five steps to complete one revolution of the alphabet scrambler.

Therefore, with the alphabet scrambler 57 in normal home position, the brushes 82 thereof engage the conducting segments 86 of rings 84 to establish a circuit described hereinbefore from battery 212 to coil of relay 216, energizing said relay. A circuit from the battery 212 is now established as follows, upon operation of the test key TK, battery 212, contact 218 of relay 216, conductor 232, contact 104a of disc 104, conductor 233, contact 71 associated with gear 60, conductors 234 and 316, contact 315 of relay 254, contact 266 of relay 260, contacts 317 of TK key, conductor 318, contact 319 of relay 320, coil of relay 320 to ground, energizing the last mentioned relay. Contacts 321 of relay 320 make before the said contacts 319 break and thus establishes a holding circuit for relay 320 from battery 212, conductor 221, cam operated contacts 295 controlled by the carriage return key bar at the translating unit, contact 242 of relay 223, conductors 296 and 322, contacts 321, coil of relay 320 to ground.

Through the contact 322 grounded battery 323 is connected to conductor 324, motor magnet 276 of rotary switch 237 to ground, energizing the said magnet. The rotary switch brushes are not stepped ahead to engage the adjacent contacts until the magnet 276 is deenergized.

It should be mentioned that operation of the test key TK opens the contacts 268 which disconnects battery from the solenoids 297 and 42b which it will be remembered are the keyboard lock and carriage return lock solenoids respectively, thus rendering the complete keyboard at the operating unit operative.

The said battery connected to conductor 324 is now connected to the solenoid 325 through contact 370a and thereby energizing the solenoid which is connected to the period character key bar at the operating unit. This operation is effective to print a period at the end of the last line of the group of the operating unit. It is seen that the depression of the said key bar does not cause the operation of the program device through the common operated contacts 250 because the battery is disconnected from the said contacts at this time due to contact 253 being open.

Depression of the period key bar causes the associated cam contacts 40 to be operated and as explaned are now effective to energize the period character key bar solenoid at the translating unit to cause the period character to be printed at the end of the last line of the coded text.

Depression of the period key bar at the operating unit also causes the additional associated cam contacts 326 (Fig. 17A) to be operated to connect the battery impressed on conductors 296 and 310 to the solenoid 327 which is connected to the carriage return key bar at the operating unit and as explained hereinbefore depression of the carriage return key bar at the operating unit causes the associated cam contacts 300 (Fig. 17) to be closed to energize the carriage return solenoid at the translating unit. Thus, it is seen that the period character is recorded at the end of the group of lines of both texts indicative of correct functioning of the various units during the said group of lines and that the carriages of both units are returned to the left margin automatically.

Depression of the carriage return key bar at the translating unit operates the associated cam contacts 295 to open and disconnect battery from the relays 291, 292, 304, 254, and 320, deenergizing said relays. The test lamp 309 is extinguished and the rotary switch is now stepped ahead so that the brushes engage the adjacent associated contacts. Deenergization of relay 254 causes relay 284 to be deenergized thus deenergizing the relays 124 and 124a. Closing of contact 283 of relay 284 permits the battery to be impressed on conductor 285 again to energize one of the sequence control relays and in this manner the alphabet and numeral scrambler units are connected so as to be interposed between the operating and translating units. Relay 216 is the only relay that is energized at this point, so that with the various coding units in normal home position, the carriages of both units in the left margin position and the character key and carriage return key locks released, and the brushes of the rotary switch 237 stepped ahead one step, so that the equipment is now conditioned for another line group operation. Further description of the normal operating circuits during the coding or decoding cycle is deemed not necessary, for the subsequent circuits energized are similar to the ones just described, the difference of operation being that the time of operation has been changed due to the stepping ahead of the rotary switch.

The circuits energized during the decoding operation are similar to the ones explained for the coding operation, with this exception which was mentioned, that the space cam operated contacts 251 are rendered ineffective to step the coding units ahead in the same manner as in coding. This is controlled by contacts 328 of the CK key and when the key is in decoding position the said contacts are opened to open the parallel connection of the space cam contacts 251 and the common operated contacts 250.

*Error key operation*

The description just set forth assumed that the various elements of the system functioned correctly. Let it be assumed now that at the end of any line (except the last line of each group) the carriages of the typewriters are out of alignment so that the carriage return lock maintained by solenoid 42b is not released. It is remembered that the insulating spots on the carriage contact bars when in alignment at the end of each line open the circuit to relay 260 to deenergize the said solenoid 42b. If this occurs during any of the said lines and an attempt is made to manually restore the carriages to the left margin position and it is found that the release of the carriage return key bar has not been effected, the following operation is necessary.

The error key EK is then depressed permitting current from battery 212 to be impressed on conductor 221, cam contacts 295 associated with the carriage return key bar at the translating unit, contact 242 of relay 223, conductor 296, contact 329 of said error key, coil of relay 271, conductor 330, contact 331 of relay 265 to ground, energizing relay 271 causing the contacts 332 and 333 to be closed and contacts 270 to be opened.

Contact 270, now opened, disconnects the battery circuit 261, contact 268 of TK key, conductor 269 from conductor 272 and contact 267 of relay 260 to deenergize the solenoid 42b thereby releasing the carriage return key bar at the operating unit. The said battery circuit is also connected to contact 293 of relay 292 (which, it is remembered, is energized at the end of each line) to energize keyboard lock solenoid 297; however, opening of contact 270 of relay 271 is also effective to release the said keyboard lock.

Battery connected to conductor 296 is now connected to contact 333 of relay 271 to energize relays 254 and 304, and the test lamp 309. Contact 307 of relay 304 opens the circuit from the character @ cam contacts 40 to relay 271. Closing of contact 305 is ineffective to energize the lock solenoids 297 and 42b due to contact 270 being open and disconnecting the power circuit 261 therefrom.

Closing of contacts 311 causes the relay 284 to be energized to operate the relays 124 and 124a as follows: grounded battery 212, conductor 221, contact 225 of relay 220, conductor 282, coil of relay 284, conductor 312, contact 311 of relay 254, conductor 313 to ground, energizing relay 284. Opening of contact 283 disconnects the battery circuit 282 from the cam controlled contacts 106a, 107a and 108a to deenergize any one of the sequence control relays 130a to d, 190a to d, 191a to d which may have been energized. The purpose of deenergizing the said sequence control relays has been explained hereinbefore. Through the contact 314 of relay 284, relays 124 and 124a are energized to effect direct connection from the cam operated contacts 40 of the primary unit to the corresponding solenoids 42 of the translating unit for purposes mentioned hereinbefore.

Contact 253 of relay 254 opens the battery circuit 252 normally connected to the common contacts 250 so as to prevent any false actuation of the coding control units upon the depression of any key bar at the operating unit during the described cycle. Operation of contacts 303 and 315 of relay 254 are ineffective during the described cycle to control the associated circuits.

Through the closed contact 332 of relay 271, the power circuit 296 is connected to one side of the coil of relay 334, but it is seen that the same power circuit is connected to the other side of the said coil of relay 334 through the closed contact 329 of the error key EK. For this reason, relay 334 remains deenergized while the error key is operated. However, upon release of said key the following circuit is established to operate relay 334: power circuit 296, contact 332 of relay 271, coil of relay 334, coil of relay 271, conductor 330, contact 331 of relay 265 to ground, maintaining relay 271 energized and operating relay 334.

Closing of contact 335 of relay 334 is effective to energize the clutch homing coils of the various coding control units to position the said units to correspond to the positions occupied at the last test period, that is, to return the said units to a position corresponding to the normal home position as shown in the drawings. Attention was called to the fact that if the coding control units functioned properly during the typing of the said grouping of lines, at the end of the group the said units would have completed a full revolution or revolutions and be positioned in the normal home position as shown. Therefore, it is obvious that during the typing cycle the coding control units have been positioned to some other position than home position.

For the purposes of illustration it will be assumed that all the units, the alphabet scrambler, numeral scrambler and program device are in a position other than normal home position.

Returning now to the circuits established through the now closed contact 335 of relay 334, grounded battery 212 is impressed on conductor 221, contact 217 of relay 216, conductor 337, clutch homing coil 338 of the alphabet scrambler, conductor 339, brush 340, associated ring 341, rings 85 and brushes 83, ring 342 and brush 343, conductors 344, 345 and 346, said contact 335 of relay 334 to ground, energizing said clutch homing coil. It is remembered that the clutch unit 51b is now rendered operative and remains so during the interval the battery is impressed on said coil.

It is preferred in returning the various coding control units to home position to permit the units to be advanced continuously to within two or three steps from the home position. To insure more positive and accurate operation the said units are then advanced step by step until the home position is reached. To impart the stepping impulses to the different clutch homing coils of the units an impulse commutator 347 (Figs. 1, 2 and 17) is provided. The commutator is mounted on the continuously rotated shaft 48 and comprises three insulated rings 348 having a common conducting segment 349 disposed thereon, said segment sufficiently long enough to initiate an impulse to energize the clutch homing coil to effect operation of the clutch units. Suitable brushes 350 are provided to engage the corresponding insulated ring. A common conducting ring 351 and brush 352 are provided, the said common ring 351 is connected to the conducting segment 349.

During the interval the homing coil 338 of the alphabet scrambler clutch unit 51b is energized, the said scrambler is advanced or rotated to approach its home position. The conducting rings 85 of the scrambler are rotated and permit the described circuit to be maintained through the cooperating brushes 83 until the insulated segment 87 disposed on conducting rings 85 are positioned to engage brushes 83 to open the said homing coil circuit. It was mentioned hereinbefore in the description of the alphabet scrambler unit that the insulated segment section is equivalent to three steps of the scrambler unit cycle. Therefore, when the circuit to brushes 83 is opened, the following circuit is established to the clutch homing coil through the said homing commutator 347 to impress three successive impulses upon the homing coil and thereby causing the scrambler unit to be advanced step by step to home position: grounded battery 212, conductor 221, contact 217 of relay 216, conductor 337, said homing coil 338, conductor 353, associated brush 350, conducting segment 349 of rotating ring 348, ring 351 and brush 352, conductor 346, contact 335 of relay 334 to ground, energizing the homing coil by the impulses set up by the homing commutator 347 and thereby advancing the alphabet scrambler unit 57 step by step to home position. Upon being positioned in home position, the brushes 82 of the scrambler unit engage the conducting segment 86 of insulated rings 84 to permit battery 212 to energize relay 216 through conductor 213, brush 214a and ring 215a, segments 86 and brushes 82, ring 215b and brush 214b to coil of relay 216 to ground. Contact 217 is then opened to remove battery from the said homing coil 338, and contact 218 now closed connects the battery through conductor 232, contact 104b now closed and operated by cam disc 104, homing coil 354 of clutch unit 51a of the numeral scrambler 55, contacts 105a now closed, conductors 345 and 346, contact 335 of relay 334 to ground, energizing the said numeral scrambler homing coil to advance the scrambler unit to home position.

It was mentioned that the recess on cam disc 105 is elongated to operate the associated contacts 105a at the home position and the last two steps in the cycle of the said scrambler unit. Therefore, as the unit approaches home position, the contacts 105a are opened to disconnect the battery to the homing coil as described. The provision is made to step the unit to home position during the last two steps of the cycle and to this end the homing coil 354 is now energized periodically by a circuit through the homing commutator 347 as follows: battery circuit 232, contact 104b, homing coil 354, brush 350 and segment 349 of commutator 347, conductor 346, contact 335 of relay 334, to ground, advancing the numeral scrambler unit to home by steps. In home position, contact 104b is opened and contact 104a is closed by cam disc 104, contact 104b disconnects battery from the unit homing coil and contact 104a now connects battery to the homing coil 355 of the program device 53, through conductor 233, contact 70, now closed, homing coil 355 of clutch unit 51, conductor 356, contacts 69, conductor 346, contact 335 of relay 334 to ground, energizing the program device clutch homing coil and thereby advancing the device to its home position. Contacts 69 disposed on gear 68 of the device are adapted to be opened for the last three steps of the cycle of the unit to permit the unit to be stepped to home position. Opening of contacts 69 causes the circuit just described to be opened and transfer the circuit to the homing impulse commutator as follows: the homing coil 335, conductor 357, homing commutator 347, conductor 346, contact 335 to ground, energizing the coil 355 successive to step the program device ahead to home position.

Contact 70 is then opened to disconnect battery from the homing coil and contact 71 is closed to operate the error indicating symbol, the fraction bar which is recorded at the end of the line of both the clear and coded text. This circuit is from grounded battery 212, contact 218 of relay 216, conductor 232, contact 104a, conductor 233, contact 71, conductor 316, contact 336 of relay 334 to solenoid 358 to ground, energizing said solenoid which is connected to the fraction key bar at the operating unit and recording the symbol on the copy thereat. Depression of the said key bar operates the cam contacts 40 associated therewith and causes the fraction bar solenoid 42 at the translating unit to be operated to record the symbol on the copy at that unit. The fraction bar solenoid is energized due to the direct connection to the cam contact 40 of the fraction key bar effected by the energization of relays 124 and 124a.

In addition to operating the cam contacts 40 associated with the fraction key bar, contacts 359 (Fig. 17A) are operated by the cam to energize the carriage return solenoid 327 at the operating unit causing its carriage to be returned to the left margin position. Operation of the carriage return key bar at the operating unit causes the cam operated contacts 300 to be closed, energizing the carriage return solenoid at the translating unit causing the carriage there to be returned to the left margin position. Operation of the carriage return key bar at the translating unit operates the associated cam contacts 295 to disconnect battery from power circuit 296 deenergizing relays 291, 292, 271, 334, 254 and 304. The equipment is now in a condition for further operation of the typing cycle described hereinbefore.

It is to be noted that upon depression of the error key EK, the positions of the rotary switch brushes were not changed; that is, a complete reset cycle was not effected to restore all the coding control units to home position. The rotary switch is operated, as explained, upon operation of the test key TK when the units functioned correctly. When the units do not function correctly during the typing of the group of lines, the TK key is not effective to advance the brushes of the rotary switch. At this point, the error key must be operated to reset the coding control units to the last test point position. The same is true when an error occurs during the line, the error key must be operated, when the carriage return key is not released at the end of the line, to reline the coding control units to the position during the last test or proving operation. Therefore, it is obvious why it is important not to alter the position of the rotary switch brushes during the said operations.

Similarly, if an error should occur during the typing of the group of lines, such as the failure of any of the scrambler units or program device to be operated one or more times, or if one of the carriages of the units failed to operate one or more times during the last line of the group and the test key TK is operated when the end of the group is reached, the circuits including correct function of the system are not energized indicating that an error occurred and a further operation is necessary; namely, operation of the error key EK.

It was explained that if the coding control units are not in the correct position at the end of the group, closing of contacts 317 of the test key does not establish a complete circuit, to energize relay 320 (described hereinbefore) due to one or more of the following contacts being open: contact 71 of the program device, contact 104a of the numeral scrambler, or contact 218 of relay 216 due to brushes 82 of the alphabet scrambler causing an open circuit to coil of relay 216.

When this condition just explained exists, the error key EK is operated to energize the same circuits in connection with the error key operation just set forth to cause the coding control units to be reset to the position occupied at the last test point, to record a fraction bar at the end of the group of lines on both copies of text, automatically return the carriages to the left margin position and extinguish the test lamp and condition the elements of the system for further typing operations.

The error detecting and correcting circuits just described function in the same manner during the coding and decoding operation.

Operation of the coding key CK does not affect the circuit connections to the relays operated during the said cycle, except that in coding the character @ cam contacts are connected to operate the relay 271 through conductor 360, contact 307 of relay 304, conductor 361, coil of relay 271, conductor 330, contact 331 of relay 265 to ground. In coding, it was mentioned, the character @ is used to be interposed in the coded text, and is the extra character necessary when the automatic spacing feature is used.

In decoding, however, the character @ key bar is operated and is not connected to operate the error indicating circuit just described. Operation of relay 271 causes the test lamp 309 to be energized which is an indication to the operator that an error has been made and the units are reset automatically the operation of which is similar to the operation initiated by the error key EK. In decoding position of CK key the contacts 154 disconnect the circuit 281 from the space solenoid to prevent the interposition of spaces automatically, the space solenoid is then connected to contacts 179 and the coding commutator so as to be operated in accordance with the coded text.

It should be mentioned at this time that operation of the MK key in the positions A or B does not alter and effect the coding and decoding control circuits described because the contacts 256 operated in position A are connected in parallel to the contacts 362 operated in position B. However, with the said key in position C to effect typing in clear text on both operating and translating units, circuits are established to energize the relays 124 and 124a as follows: grounded battery 323, conductor 363, coil of relay 265, conductor 364, contacts 365 and 366 of MK key to ground, energizing relay 265, closing the contact 367 and opening the contacts 264 and 331.

If the circuits connected to contacts 264 and 331 should be energized when the MK key is set to C position, they are deenergized during the period the clear text is inserted.

Contact 367 establishes a circuit to energize relay 284 to operate the relays 124 and 124a from grounded battery 212 to conductor 221, contact 225 of relay 220, conductor 282, coil of relay 284, conductor 312, said contact 367, to ground. Contacts 283 of relay 284 are now effective to deenergize the sequence control relays and contacts 314 and closed to energize relays 124 and 124a, thus effecting a direct connection between the cam contacts of the operating unit and controlling solenoids of the translating unit.

*Reset operation with code units displaced from home position*

The description will now be given relating to resetting all the coding control units to the normal home position; namely, the alphabet scrambler unit, numeral scrambler unit, program device and the rotary switch. The resetting operation described in the error key operation related only to resetting the units to the last group test position. It will be assumed that all the units are displaced from the home position.

Upon operation of the reset key RK the associated contact 219 is closed to energize relay 220 from battery 212, conductor 221, coil of relay 220, said contact 219 to ground. Upon release of the reset key, relay 227 is energized as described hereinbefore in connection with the previous resetting operation with the controls in home position.

Grounded battery 212 is now impressed upon conductor 221, contact 217 of relay 216, conductor 337, homing coil 338 of the alphabet scrambler unit 57, conductor 339, brush 340, ring 341, conducting segments 85 and brushes 83, ring 342, brush 343, conductors 344 and 345, contact 231 of relay 227 to ground, energizing the said homing coil to advance the said unit to within three steps of the home position when the brush circuit 83 is opened to transfer the battery circuit through the homing impulse commutator 347 to advance the said unit to home position by steps, as explained in the description of the error key operation. The only difference in the circuit connections is that the ground is established through contact 231 of relay 227 instead of the ground connection established through contact 335 of relay 334 in the said preceding description.

When the alphabet scrambler unit is in the home position, relay 216 is energized as described hereinbefore due to the circuit established through segments 86 and the associated brushes 82 of the said unit.

The battery 212 is then impressed on the circuit 232 connected to contact 218 of relay 216 to energize the homing coil 354 of the numeral scrambler unit, through the contacts 105a operated by disc 105. The return circuit to ground however, is established through conductor 345 in place of conductor 346, with this exception the numeral scrambler 55 is advanced to within two steps of home position and then advanced in successive steps to home in the same manner as described before. Similarly the program device 53 is returned to the normal home position in accordance with the previous description.

Now with the said three coding control units in home position, grounded battery 212 is impressed on the power circuit 232, contact 104a of the numeral scrambler, conductor 233, contact 71 of the program device, conductor 234, contact 235 of relay 220, conductor 235a, brush 236 and corresponding engaged contact of bank 3 of the rotary switch 237, conductor 369, contact 370 and motor magnet coil 276 to ground, energizing the said motor magnet, and opening contact 370 to deenergize the magnet whereupon the brushes of the rotary switch are advanced one step.

So long as the brush 236 engages any one of the contacts connected in common to conductor 369, the motor magnet is operated to continue to advance the said brushes step by step until they are positioned in the normal home position as shown. The power circuit 235a is then connected to conductor 241 to energize the relay 223 and the home indicator, signal 247. A holding circuit is established through contact 243 and conductor 234, the detailed description of which was given in the previous resetting operation. The relays 220 and 227 are deenergized due to contact 222 opening and also described hereinbefore. The system is now in condition for the initial operation of coding and decoding according to the position of the CK key and this fact is indicated by the energization of the said lamp signal 247. Upon operation of the character keys the program device is advanced a step which is now understood to open contact 71 and deenergize relay 223 and the signal lamp 247.

*Home position selecting operation*

In order to change the reference or home position of the coding control units, provision is made whereby the home position of the alphabet scrambler unit may be positioned selectively at will to increase the complexity of the coded text messages. The description of this feature will now be given. It will be assumed that the ring member 81 (Figs. 1, 6, 7, and 17) supporting the brushes 82 is not in its fixed reference or home position as shown in the figures. It is then necessary to restore the said member to its fixed reference point before setting it to a new position. A code key lock 371 is provided, and can be any well known type of key operated contact lock such as the usual automobile ignition switches, to maintain the code selector circuits inoperative during the period the key 372 is not inserted to operate the control contacts 373.

Upon operation of contacts 373 battery 212 is applied to circuit 374, contacts 373 and the following selector circuits. To restore the ring member 81 to its fixed reference point it is necessary to operate the home key HK. Through the contacts 376 of the HK key, relay 245 is energized by impressing the power circuit 375 on contact 378 of relay 379, conductor 380, said contacts 376, conductor 381, coil of relay 245 to ground. The contacts 244 of relay 245 are opened to release the holding circuit to relay 223 to extinguish the signal lamp 247 should these be energized.

Through contacts 377 of the HK key the power circuit 375 is impressed on conductor 382, contact 117 operated by disc or ring member 81, contacts 97 of magnet 90, coil of said magnet to ground energizing the magnet and opening contacts 97. Upon deenergization of the magnet the disc 81 is advanced a step and is continued to be advanced step by step until the disc is positioned at home to open its contact 117, disconnecting the power circuit from the motor magnet 90 and closing contact 116 to connect the battery to conductor 383 to coil of relay 379, energizing said relay causing contact 378 to be opened and contacts 384 and 385 to be closed. Upon release of the HK key relay 245 is deenergized and a holding circuit for relay 379 is established through contact 385 of relay 379 and contact 386 of relay 245. The signal lamp 387 is now energized indicating that the disc 81 is in its home position and that a new reference setting may now be initiated. The dial 388 which is a standard telephone dial and needs no further description may be operated to set the brushes 82 and 83 at different positions on the associated rings. This setting is not effective in causing an additional transposition of the connections between the operating and translating units until the operation of the reset key RK.

Operation of the dial 388 to select a new position for the alphabet scrambler 57 actuates contacts 389 on the dial which close the power circuit relay 245, causing the relay 379 to be deenergized and the signal lamp 387 to be extinguished due to opening of contact 386. Contact 244 when opened will release 223 and the signal lamp 247 as described before. When the dial is released, contacts 390 are closed and opened a number of times determined by the digit dialed. This series of impulses impressed on conductor 391 operates the motor magnet 90 to position the ring member 81 and brushes 82 and 83 in accordance with the digit or digits dialed. Thus the position of the said brushes is changed and no longer is the alphabet scrambler unit in its home position; that is, the brushes 82 no longer engage the conducting segment 86. Removal of the code key 372 after the setting is made prevents any further changes to be made in positioning the brushes 82 and 83. Operation of the reset key RK now will return the rings 84 and 85 of the alphabet scrambler unit in its home position in accordance with the new reference point established by brushes 82 and 83. This reset operation is understood and needs no further explanation. The system is then in position for further coding or decoding operations depending upon the position of the code key CK.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A coding and decoding machine comprising a manually operable primary machine, a secondary machine operable from the first, coding means interposed between and interconnecting the machines, said coding means comprising a plurality of individually operable circuit changing units allotted, respectively, to different groups of the characters to be coded and decoded, individual controlling means for shifting the respective circuit changing units, and means to operate said individual controlling means at arbitrarily determined irregular intervals.

2. A coding and decoding machine comprising a manually operable primary machine including a complete series of character key bars, a secondary machine responsive to the operation of the first and including a complete series of character typebars, a circuit changing device interposed between and interconnecting the machines so that the operation of certain of the keybars of the series effects the operation of certain of the typebars of the series, a second circuit changing device interposed between and interconnecting the machines so that the operation of certain other keybars of the series effects operation of other typebars of the series, and means to control the individual positioning of the said circuit changing devices at irregular and arbitrary intervals.

3. A coding and decoding machine comprising a manually operable primary machine, a secondary machine operable from the first, coding means comprising a movable circuit changing device interposed between and interconnecting the machines, the said device adapted to have the circuit connections disposed in a definite sequence, means to position the said coding means at different intervals, and means to alter automatically the sequence of the circuit connections of the said device while the coding means remains stationary and including means to render the said circuit sequence changing means effective during the operation of the machines.

4. A coding and decoding machine comprising a manually operable primary machine including character transmitting instrumentalities, a secondary machine responsive to the operation of the first and including character recording instrumentalities, a shiftable circuit changing device interposed between and interconnecting the machines, for varying the individual relations of the character transmitting and character recording instrumentalities; means for shifting said circuit changing device, including a plurality of individually adjustable control instrumentalities movable in response to operations of said transmitting instrumentalities and each capable of controlling the intervals between operations of said shifting means in reference to the number of operations of said transmitting instrumentalities, and means for transferring the control of said shifting means from one of said control instrumentalities to another comprising means automatically conditioned for operation each time a prescribed number of operations of said transmitting instrumentalities have been executed.

5. A coding and decoding machine comprising a manually operable primary typewriter including a carriage and keyboard comprising character keybars and a carriage return keybar, a secondary typewriter operable from the first and including a carriage and typebars, coding means interposed between and interconnecting the typewriters so that operation of certain of the keys at the primary typewriter effects the operation of certain of the typebars of the secondary typewriter, the said carriages adapted to be advanced each time the said keybars or typebars are operated, control means associated with said carriages, and means controlled by said control means to render the said carriage return key bar inoperative in the event that either carriage failed to be advanced accordingly during the operation of the said keybars and typebars.

6. A coding and decoding machine comprising a manually operable primary typewriter including a carriage and keyboard comprising character keybars and a carriage return keybar, a secondary typewriter operable from the first and including a carriage, carriage return control mechanism and typebars, coding means interposed between and interconnecting the typewriters so that operation of certain of the character keybars at the primary typewriter effects operation of certain of the typebars of the secondary typewriter, the said carriages adapted to be advanced each time the said keybars or typebars are operated, control means associated with said carriages, and means controlled by said control means to render the said carriage return keybar inoperative immediately upon operation of a character keybar at the primary typewriter.

7. The invention set forth in claim 6 with additional means provided to render the said carriage return keybar inoperative for a predetermined number of operations of the said character keybars.

8. A coding and decoding machine comprising a manually operable primary machine including a carriage return mechanism and keyboard including character keybars, a secondary machine operable from the first and including character typebars, coding means interposed between and interconnecting the machines so that operation of certain of the said keybars effects operation of certain of the said typebars, means to render said carriage return mechanism inoperative immediately upon operation of a character keybar, and means to render said keybars inoperative and release said carriage return mechanism to render it operative after a predetermined number of operations of said keybars.

9. The invention set forth in claim 8 in which means are provided to release said keybars and render them operative upon operation of the said released carriage return mechanism.

10. The invention set forth in claim 6 in which means are provided to release said carriage return keybar and render it operative after a predetermined number of operations of the said character keybars.

11. A coding and decoding machine comprising a manually operable primary typewriter including character transmitting instrumentalities and carriage return control mechanism, and means to record the characters corresponding to the operated instrumentalities, a secondary typewriter operable from the first including character recording instrumentalities, coding means interposed between and interconnecting the typewriters so that operation of certain transmitting instrumentalities effect operation of certain of the said recording instrumentalities, means controlled by the operation of said character transmitting instrumentalities to control the operation of said coding means, means effective after a predetermined number of operations of said character transmitting instrumentalities, to render the last mentioned instrumentalities and carriage return control mechanism inoperative, and means to release and render operative the said transmitting instrumentalities and carriage return control mechanism if the said coding means operated correctly and in accordance with the operations of said transmitting instrumentalities.

12. The invention set forth in claim 11 in which means is provided to record a symbol as an indication of correct operation of the coding means, on both of said typewriters upon operation of said releasing means.

13. The invention set forth in claim 11 in which means is provided to automatically operate the carriage return control mechanism upon operation of said releasing means.

14. The invention set forth in claim 11 in which additional control means for said coding means are providing and adapted to be operated upon the release of said transmitting instrumentalities.

15. A coding and decoding machine comprising a manually operable primary typewriter including character keybars and carriage return control mechanism, a secondary typewriter operable from the first including character typebars and carriage return control mechanism, movable coding means interposed between and interconnecting the typewriters so that operation of certain of said keybars effects operation of said typebars, with said coding means positioned in a normal starting position, means to control the positioning of said coding means the operation of which is controlled by the frequency of operation of the keybars, means to lock the keybars and carriage control mechanisms rendering them inoperative after a predetermined number of operations of said keybars, means adapted to be operated to release the locking means if the coding means and control means therefor operated correctly in accordance with the frequency of operation of the key bars, means to be operated in the event the coding means and control means therefor operated incorrectly to release the said locking means and automatically re-align the coding means and control means therefor to the said normal starting position.

16. The invention set forth in claim 15 in which means are provided to automatically record a symbol at both the primary and secondary typewriters upon the operation of said means which is operated in the event the coding means and control means operated incorrectly.

17. The invention set forth in claim 15 in which means are provided to automatically operate the said carriage return control mechanisms upon operation of the said means operated in the event the coding means and control means operated incorrectly.

18. A coding and decoding machine comprising a manually operable primary machine, a secondary machine operable from the first, coding means comprising a rotary circuit changing device interposed between and interconnecting the machines, means to position and advance the said coding means at certain intervals by imparting a partial rotary movement thereto, and means to position and advance the said coding means by imparting automatically a continuous rotary movement thereto and a manually operated control means to render operative the last mentioned positioning and advancing means.

19. A coding and decoding machine comprising a manually operable primary machine, a secondary machine operable from the first, coding means comprising a movable circuit changing device interposed between and interconnecting the machines, said coding means having a normal starting position, means to position the said coding means at certain intervals during a coding or decoding cycle by imparting a partial movement thereto, and means to reset the said coding means to the said normal starting position in preparation for a subsequent coding or decoding cycle including means to impart automatically a continuous movement thereto.

20. A coding and decoding machine comprising a manually operable primary machine having a keyboard including character keys and a space bar, a secondary machine including character keys and space bar mechanism, transposing means interconnecting the machines for causing operation of either a character key or the space bar of the primary machine to effect operation of a character type of the secondary machine, means for automatically operating the space bar mechanism of the secondary machine after a predetermined number of keyboard operations of the primary machine, and means settable to one position whereby the operation of a character key or space bar of the primary machine effects the operation of a character type of the secondary machine and settable to another position whereby the space bar at the primary machine is rendered inoperative whereas operation of the character keys is effective to cause the operation of substitute character types at the secondary machine.

21. A coding and decoding machine comprising a manually operable primary machine, a secondary machine operable from the first, means to initiate control impulses upon operation of the primary machine, movable coding means interposed between and interconnecting said machines, control means to position said coding means and operated by the said control impulses, said operation effected upon the decay of the control pulses, means to initiate additional control impulses, and means included in said control means responsive to said additional impulses to operate the coding means, said last named operation effected upon the initiation of the additional impulses.

22. A coding and decoding machine comprising a manually operable primary machine, a secondary machine operable from the first, coding means interposed between and interconnecting the machines and control means therefor, said coding means having a normal starting position, means under control of the operator to condition the coding means for a new starting position in accordance with automatically measured adjustments of selected extent imparted thereto, and means, to operate the said control means to position the conditioned coding means to the new starting position.

23. A coding and decoding machine comprising, in combination, a manually operable primary machine, a secondary machine operable from the first, coding means comprising a movable circuit changing device interposed between and interconnecting the machines, the said device adapted to have the circuit connections disposed in a definite sequence, means to position the coding means at different intervals, and non-rotary means to alter the sequence of the circuit connections of said device automatically.

24. A coding and decoding machine comprising, in combination, a manually operable primary machine, a secondary machine operable from the first, coding means comprising a movable circuit changing device interposed between and interconnecting the machines, the said device having the circuit connections disposed in a definite sequence, means to position the coding means at different intervals, and means comprising relay devices to alter the sequence of the circuit connections of said device.

25. A coding and decoding machine comprising, in combination, a manually operable primary machine, a secondary machine operable from the first, movable coding means interposed between and interconnecting the machines, circuit connections from the primary machine to the coding means and from the coding means to the secondary machine disposed in a definite sequence, means to position the coding means thereby transposing the said circuit connections, and additional means included in the circuits leading to and from the coding means to alter the said sequence of connections leading to and extending from the said coding means and control means to render said additional means operative during the operation of the machines.

26. A coding and decoding machine comprising, in combination, a manually operable primary machine, a secondary machine operable from the first, movable coding means interposed between and interconnecting the machines, circuit connections from the primary machine to the coding means and from the coding means to the secondary machine and disposed in a definite sequence, means to position the coding means at different intervals thereby transposing the said circuit connections, switching means inserted in the circuits between the primary machine and the coding means and between the secondary machine and the coding means, and means to operate the said switching means automatically including means to control the last mentioned operating means at different intervals during the operation of the machines.

27. The invention set forth in claim 26 wherein means are provided to operate the said switching means synchronously.

28. A coding and decoding machine comprising, in combination, a manually key operable primary machine, a secondary machine operable from the first, movable coding means comprising a circuit changing device interposed between and interconnecting the machines, the circuit connections leading to and from the coding means disposed in a definite sequence, control means operated each time the keys of the primary machine are operated, means associated with the control means to control the positioning of the coding means and including means to render the frequency of operation of the coding means such as to vary from the frequency of operation of the keys, means to alter the sequence of the said circuit connections, said means associated with the said control means provided to control the operation of the sequence changing means, including means to control the operation of the sequence changing means so as to be operated at a frequency other than the frequency of operation of the keys and said coding means.

29. A coding and decoding machine comprising, in combination, a primary machine having manually operable key members, a secondary machine having operating instrumentalities and operable from the first machine, coding means comprising a circuit changing device interposed between and interconnecting the machines, the circuit connections leading to and from the coding means disposed in a definite sequence and connecting the machines to reciprocally pair the said key members and instrumentalities so that operation of any selected key of the primary machine operates a particular substitute operating instrumentality of the secondary machine, and operation of the primary key corresponding to the substitute operating instrumentality operates an operating instrumentality of the secondary machine corresponding to the key originally operated, and means included in the circuits between the primary machine and the coding means and in the circuits between the coding means and the secondary machine to change the sequence of the said connections leading to and from the coding means and including means to maintain the said reciprocal connected relationship.

30. A coding and decoding machine comprising in combination, a manually operable primary machine, a secondary machine operable from the first, coding means comprising a movable circuit changing device interposed between and interconnecting the machines, the circuit connections leading to and from the coding means disposed in a definite sequence and connecting the machines so as to maintain a predetermined relationship, means to position the circuit changing device to transpose the circuit connections, and means to alter the sequence of connections leading to and from the coding means and including means to maintain the said predetermined relationship.

31. A coding and decoding machine comprising, in combination, a primary machine, a secondary machine operable from the first, coding means comprising a movable circuit changing device interposed between and interconnecting the machines, the circuit connections leading to and from the coding means disposed in a definite sequence, means to position the coding means to transpose the circuit connections, a plurality of control means associated with the circuits leading to and from the coding means, and means to operate predetermined ones of said control means at irregular intervals to alter the sequence of connections to and from the coding means.

32. A coding and decoding machine comprising, in combination, a primary machine, a secondary machine operable from the first, coding means comprising a movable circuit changing device interposed between and interconnecting the machines, the circuit connections disposed in a definite sequence, means to position the coding means to transpose the circuit connections, and a plurality of control means to alter the sequence of the said circuit connections including means to control the operation of any one of the said control means, thereby effecting a change in the sequence of the circuit connections.

33. A coding and decoding machine comprising, in combination, a primary machine, a secondary machine operable from the first, coding means comprising a movable circuit changing device interposed between and interconnecting the machines, the circuit connections leading to and from the coding means disposed in a definite sequence, means to position the coding means at different intervals to transpose the circuit connections, means to alter the sequence of the circuit connections at varying intervals, and means to condition the machines so that coding and decoding operations can be effected from the primary machine so as to operate automatically the coding means, positioning means and sequence changing means at the same varied intervals during coding and decoding operations.

34. A coding and decoding machine comprising, in combination, a primary machine, a secondary machine operable from the first, coding means comprising a movable circuit changing device interposed between and interconnecting the machines, the circuit connections between the primary machine and coding means and between the coding machines and secondary machine disposed in a definite sequence, means to position the coding means at different intervals to transpose the circuit connections, a plurality of control means associated with the circuits and means to operate certain ones of the control means at various intervals to alter the sequence of the circuit connections between the machines, and means to condition the machines so that coding and decoding operations can be effected from the primary machine so as to operate automatically the coding means and circuit sequence changing means in the same order and at the same varied intervals during coding and decoding operations.

35. A coding and decoding machine comprising, in combination, a manually operable primary machine, a secondary machine operable from the first, coding means comprising a movable circuit changing device interposed between and interconnecting the machines, the circuit connections leading to and from the coding means disposed in a definite sequence, means to position the coding means to transpose the circuit connections between the machine means to alter the sequence of the circuit connections between the machines, a plurality of control switching means operated in different combinations upon each operation of the primary machine to control the positioning of the coding means and the circuit sequence changing means.

36. A coding and decoding machine comprising, in combination, a manually operable primary machine, a secondary machine operable from the first, coding means comprising a movable circuit changing device interposed between and interconnecting the machines, the circuits leading to and from the coding means disposed in a definite sequence, movable means to alter the sequence of the circuit connections between the machines, control means operated upon each operation of the primary machine and means controlled by the control means to position the coding means and sequence changing means to transpose the circuit connections and alter the sequence of connections of the circuits respectively, the said operation directly dependent upon the frequency of operation of the primary machine.

37. A coding and decoding machine comprising a manually key operable primary machine, a secondary machine operable from the first through connections including coding means, said coding means comprising a plurality of individually operable circuit changing units allotted to different groups of the characters to be coded and decoded, individual controlling means for shifting the respective circuit changing units, and means responsive to the actuation of the keys of the primary machine for operating the individual controlling means to shift their related circuit changing units at frequencies different from the frequency of actuation of the keys and different from each other.

38. A coding and decoding machine comprising a manually operable primary machine, a secondary machine operable from the first, coding means comprising a circuit changing device interposed between and interconnecting the machines, the circuit connections leading to and from the coding means disposed in a definite sequence, means to position the coding means to transpose the circuit connections between the machines, means to alter the sequence of the circuit connections leading to and from the coding means, individual control devices for said coding means positioning means and said sequence altering means, respectively, and means to operate the control devices differently at varying intervals to control the operation of the coding means positioning means and the sequence changing means.

39. In a coding and decoding machine, a primary machine comprising a set of character transmitting instrumentalities, a secondary machine comprising a set of character recording instrumentalities, coding means comprising a set of contacts electrically connected to the respective character transmitting instrumentalities and a set of contacts electrically connected to the respective recording instrumentalities, said sets of contacts being mounted for mutual engagement in pairs to connect the transmitting instrumentalities individually with the recording instrumentalities, the mounting of said sets of contacts being such as to permit relative shifting to transpose the connections of the transmitting instrumentalities to the recording instrumentalities, a plurality of shifting means operable independently upon said coding means to shift said contacts, a plurality of control devices for each of said shifting means, a plurality of program members, one associated with each of the control devices and individually adjustable to determine the timing of the operations of their respective control devices, and selecting means to render said control devices effective in various combinations to control their respective shifting means.

40. In a coding and decoding machine, a primary machine comprising a set of character transmitting instrumentalities, a secondary machine comprising a set of character recording instrumentalities, coding means comprising a set of contacts electrically connected to the respective character transmitting instrumentalities and a set of contacts electrically connected to the respective recording instrumentalities, said sets of contacts being mounted for mutual engagement in pairs to connect the transmitting instrumentalities individually with the recording instrumentalities, said mutually engaging sets of contacts being arranged in a plurality of groups, the sets of contacts in each group being relatively shiftable to transpose the connections of their related transmitting instrumentalities to their related recording instrumentalities, a plurality of shifting means, one for each group of contacts, operable independently upon their respective groups of contacts, a plurality of control devices for each of said shifting means, a plurality of program members, one associated with each of the control devices and individually adjustable to determine the timing of the operations of their respective control devices, and selecting means to render said control devices effective in various combinations to control their respective shifting means.

41. A coding and decoding machine comprising a manually operable primary machine including character transmitting instrumentalities, a secondary machine responsive to the operation of the first and including character recording instrumentalities, a shiftable circuit changing device interposed between and interconnecting the machines, for varying the individual relations of the character transmitting and character recording instrumentalities; means for shifting said circuit changing device, including a plurality of control instrumentalities movable step by step through a complete cycle, each step in response to an operation of said transmitting instrumentalities, each of said control instrumentalities having adjustable means thereon adapted to cause repeated operations of said shifting means at arbitrarily determined intervals in the course of one cycle of movement of the control instrumentalities, and means for transferring the control of said shifting means from one of said control instrumentalities to another at the end of each cycle.

42. A coding and decoding machine comprising a manually operable primary machine, a secondary machine operable from the first, circuits interconnecting the machines, coding means comprising a circuit changing device included in the said circuits interconnecting the machines, means to position the coding means from a normal position to transpose the circuits, a plurality of control circuits and means to condition them, means to position the conditioning means from a normal position, circuit selector means to select certain ones of the conditioned control circuits to control the coding means, positioning means, means to position the circuit selector means from a normal position to alter the circuit selection effected, and means to reset automatically at any time the coding means, the circuit conditioning means, and the circuit selector means to the said normal positions.

43. A coding and decoding machine comprising a manually operable primary machine, a secondary machine operable from the first, circuits interconnecting the machines and disposed in a definite sequence, coding means comprising a circuit changing device included in the circuits interconnecting the machines, means to position the coding means to transpose the circuit connections, means to alter the sequence of the circuits interconnecting the machines, a plurality of control circuits for said positioning means and said sequence altering means, means to condition the respective control circuits at differently varying intervals, and circuit selector means to select certain of the conditioned circuits to cause operation of said positioning means and of said sequence altering means at arbitrary and irregular intervals.

44. A coding and decoding machine comprising a manually operable primary machine, a secondary machine operable from the first, circuits interconnecting the machines and disposed in a definite sequence, coding means comprising a circuit changing device included in the circuits interconnecting the machines, means to position the coding means to transpose the circuit connections, a plurality of devices to alter the sequence of the circuits interconnecting the machines, a plurality of control circuits for said positioning means and said sequence altering means, means to condition the respective control circuits at differently varying intervals, and circuit selector means to select certain of the conditioned circuits to cause operation of said positioning means and of certain of said sequence altering means at arbitrary and irregular intervals.

45. A coding and decoding machine comprising a manually operable primary machine; a secondary machine operable from the first; coding means comprising rotary circuit changing means interposed between and interconnecting the machines; electrically operable code shifting means to impart partial rotary movements to the coding means, to position the coding means from a normal position; a plurality of circuits; rotary control means adapted to condition each of said circuits repeatedly in the course of a rotation, the times of conditioning of each circuit being irregular and different from the others; means to impart partial rotary movements to said rotary control means, to position the same from a normal position; a rotary selector to select said circuits for control of said code shifting means; and means to impart a partial rotary movement to said selector each time said rotary control means returns to its normal position, to position said rotary selector from a normal position.

46. The invention set forth in claim 45 in which means are provided to impart a partial rotary movement to the said rotary control means upon each operation of the primary machine.

47. The invention set forth in claim 45 in which means are provided to impart a continuous rotary movement to the coding means, rotary control means and said selector to position them to the said normal positions respectively.

48. A coding and decoding machine comprising a manually key operable primary typewriter including a carriage and control mechanism therefor, a secondary typewriter operable from the first and including a carriage and control mechanism and type bars, coding means interposed between and interconnecting the typewriters so that operation of certain of the keys at the primary typewriter effects the operation of certain of the type bars of the secondary typewriter, the said carriage mechanisms adapted to be operated so as to advance the corresponding carriages each time the keys and type bars are operated, and control means controlled by the positioning of the carriages and adapted to render said carriage control mechanisms inoperative in the event that either carriage failed to be advanced during operation of the keys and type bars.

49. A coding and decoding machine comprising a manually operable primary typewriter including a carriage and keyboard comprising character and spacing key bars and a carriage return control key, a secondary typewriter operable from the first and including a carriage, carriage return control mechanism and type bars, coding means interposed between and interconnecting the typewriters so that operation of certain of said key bars at the primary typewriter effects operation of certain of the type bars of the secondary typewriter, means to advance said carriages from starting position step by step in definite relations to the actuations of said key bars, means including control circuits controlled by said carriages to lock said carriage return control key as soon as either of said carriages leaves starting position, means to lock said key bars of the primary typewriter after a predetermined number of operations of said key bars, said control circuits being adapted to release said carriage return control key at the time said key bars are locked, provided both carriages have been advanced to predetermined positions.

50. A coding and decoding machine comprising a manually operable primary typewriter including a carriage and keyboard comprising character key bars and a carriage return control key bar, a secondary typewriter operable from the first and including a carriage, carriage return control mechanism and type bars, coding means interposed between and interconnecting the typewriters so that operation of certain of the character key bars at the primary typewriter effects operation of certain of the type bars of the secondary typewriter, the said carriages adapted to be advanced each time the said key bars or type bars are operated, and control circuits controlled by the carriages so as to render the said carriage return key bar inoperative immediately upon operation of a character key bar at the primary typewriter.

51. A coding and decoding machine comprising a manually operable primary typewriter including a carriage and keyboard comprising character key bars and a carriage return control key bar, a secondary typewriter operable from the first and including a carriage, carriage return control mechanism and type bars, coding means interposed between and interconnecting the typewriters so that operation of certain of the character key bars at the primary typewriter effects operation of certain of the type bars of the secondary typewriter, the said carriages adapted to be advanced each time the said key bars or type bars are operated, and control circuits controlled by the carriages so as to render the said carriage return key bar inoperative immediately upon operation of a character key bar at the primary typewriter and to maintain said carriage return key bar inoperative for a predetermined number of operations of said character key bars.

52. A coding and decoding machine comprising a manual key operable primary typewriter including a carriage and automatical carriage return mechanism therefor, a secondary typewriter operable from the first and including a carriage and carriage return mechanism therefor and type bars, coding means interposed between and interconnecting the typewriters so that operation of certain of the keys at the primary typewriter effects operation of certain of the type bars of the secondary typewriter, means to advance said carriages step by step each time the keys and typebars are operated, and control means to render the carriage return mechanisms operative at certain predetermined carriage positions and including means to render the automatic carriage return mechanisms inoperative at any other carriage position during the operation of the typewriter.

53. A coding and decoding machine comprising a manually operable primary machine, a secondary machine operable from the first, coding means comprising a movable circuit changing device interposed between and interconnecting the machines, the said device adapted to have the circuit connections disposed in a definite sequence, means to transpose the circuit connections between the machines at irregular and arbitrary intervals by positioning the coding means, and means to alter the sequence of the circuit connections of said device and control means therefor, means to render said control means operative at predetermined intervals during the operation of the machines.

54. A coding and decoding machine comprising a manually operable primary machine, a secondary machine operable from the first, coding means comprising a movable circuit changing device interposed between and interconnecting the machines, the said device adapted to have the circuit connections disposed in a definite sequence, means to alter the sequence of the circuit connections of said device, individual control means for the coding means and the last mentioned means, and means to control individually the operation of the said control means.

55. A coding and decoding machine comprising a manually operable primary machine, a secondary machine operable from the first, coding means comprising a movable circuit changing device interposed between and interconnecting the machines, the said device adapted to have the circuit connections disposed in a definite sequence, means to alter automatically the sequence of the circuit connections of the said device and control means therefor, and means to control the operation of said control means at irregular and arbitrary intervals during the operation of the machines.

56. A coding and decoding machine comprising a manually operable primary typewriter including a carriage return mechanism and a keyboard comprising character keybars, a secondary typewriter operable from the first and including carriage return control mechanism and typebars, coding means interposed between and interconnecting the typewriters so that operation of certain of the character keybars at the primary typewriter effects operation of certain of the typebars of the secondary typewriter, individual means to control the operation of the carriage return mechanism and character keybars and control means therefor, and means to control the operation of said control means after a predetermined number of operations of the character keybars to render the carriage return mechanism and keybars inoperative.

57. A coding and decoding machine comprising a manually operable primary machine including a plurality of operable character transmitting instrumentalities and control means therefor to control the operation of the instrumentalities, a secondary machine operable from the first and including a plurality of character indicating instrumentalities, coding means interposed between and interconnecting the machines so that operation of certain of the character transmitting instrumentalities of the primary machine effects operation of certain of the character indicating instrumentalities of the secondary machine, and means to control said character transmitting instrumentalities control means, thereby conditioning the said transmitting instrumentalities to prevent operation thereof, including means to render the second mentioned control means effective after a predetermined number of operations of said character transmitting instrumentalities.

58. A coding and decoding machine comprising a manually operable primary typewriter including a carriage return mechanism and a keyboard comprising character keybars, a secondary typewriter operable from the first and including carriage return control mechanism and typebars, coding means interposed between and interconnecting the typewriters so that operation of certain of the character keybars at the primary typewriter effects operation of certain of the typebars of the secondary typewriter, individual means to control the operation of the carriage return mechanism and character keybars and control means therefor, means to control the operation of said control means after a predetermined number of operations of the character keybars to render the carriage return mechanism and keybars inoperative, and signal indicating means to indicate the said condition when the keybars and carriage return mechanism are rendered inoperative.

59. A coding and decoding machine comprising a manually operable primary typewriter including a carriage return mechanism and a keyboard comprising character keybars, a secondary typewriter operable from the first and including carriage return control mechanism and typebars, coding means interposed between and interconnecting the typewriters so that operation of certain of the character keybars at the primary typewriter effects operation of certain of the typebars of the secondary typewriter, individual means to control the operation of the carriage return mechanism and character keybars and control means therefor, means to control the operation of said control means after a predetermined number of operations of the character keybars to render the carriage return mechanism and keybars inoperative, and means controlled by the coding means to release said carriage return mechanism and character keybars to render them operative.

60. A coding and decoding machine comprising a manually operable primary machine including a plurality of operable character keys and control means therefor to control the operation of the said keys, a secondary machine operable from the first including character indicating instrumentalities, coding means interposed between and interconnecting the machines so that operation of certain transmitting instrumentalities effects operation of certain of said indicating instrumentalities, means to control the operation of said control means after a predetermined number of operations of said character keys to render the keys inoperative, a second control means, and means controlled by the operation of said second control means to release the character keys, thereby permitting further operation of the said keys.

61. A coding and decoding machine comprising a primary machine having a keyboard including character keys, a secondary machine having operating instrumentalities including character types, coding means connecting the machines effective in general to reciprocally pair the keyboard members of the primary machine and the operating instrumentalities of the secondary machine so that operation of any selected key of the primary keyboard operates a particular substitute operating instrumentality of the secondary machine, and operation of the primary key corresponding to the substitute operating instrumentality operates an operating instrumentality of the secondary machine corresponding to the key originally operated, said members and instrumentalities connected in a definite and certain sequence, means to position the coding means and alter the connections between said machines, and means operated at arbitrary and irregular intervals to alter the said sequence of connections including means to maintain the said reciprocal connection arrangement upon operation of said sequence changing means.

62. A coding and decoding machine as described in claim 4, wherein testing means are provided to render the operation of said conditioning means subject to the completion of certain prescribed movements by the control instrumentalities.

63. A machine as described in claim 41, wherein means are provided to render the operation of said transferring means subject to the arrival of said circuit changing device at a predetermined position.

WALTER S. LEMMON.
CHARLES R. DOTY.
RICHARD F. WALZ.
ALBERT C. HOLT.